US012208435B2

(12) United States Patent
Pollard, Jr.

(10) Patent No.: US 12,208,435 B2
(45) Date of Patent: Jan. 28, 2025

(54) MODIFIED LUG PRESS

(71) Applicant: DISH Wireless L.L.C., Englewood, CO (US)

(72) Inventor: Jimmy A. Pollard, Jr., Boiling Springs, SC (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/082,319

(22) Filed: Dec. 15, 2022

(65) Prior Publication Data

US 2024/0198408 A1 Jun. 20, 2024

(51) Int. Cl.

| | |
|---|---|
| ***B21D 39/04*** | (2006.01) |
| ***H01R 43/048*** | (2006.01) |
| ***H01R 43/055*** | (2006.01) |

(52) U.S. Cl.

CPC ......... *B21D 39/048* (2013.01); *H01R 43/048* (2013.01); *H01R 43/055* (2013.01)

(58) Field of Classification Search

CPC ......... Y10T 29/49183; Y10T 29/49185; Y10T 29/53235; H01R 43/048; H01R 43/055; B21D 39/048

See application file for complete search history.

(56) References Cited

U.S. PATENT DOCUMENTS

| | | | | |
|---|---|---|---|---|
| 5,127,255 A * | 7/1992 | Skotek ................. | H01R 43/055 72/428 |
| 2007/0079501 A1* | 4/2007 | Garner ................. | H01R 43/055 29/748 |
| 2015/0033526 A1* | 2/2015 | Morris ................. | H01R 43/055 29/33 M |
| 2022/0337011 A1* | 10/2022 | Kerstetter ............ | H01R 43/055 |

OTHER PUBLICATIONS

Burndy OEM Pneumatic Press, www.burndy.com, downloaded from the Internet on Nov. 12, 2022 at www.burndy.com.
Burndy OEM840NCP Dimensions, as downloaded from the Internet on Nov. 12, 2022, at https://hubbellcdn.com/salesdrawings/50024706.pdf.
Burndy Tools Catalog, downloaded from Internet on Nov. 12, 2022 at https://hubbellcdn.com/catalogfull/TOOLING%20CATALOG-August%202020.pdf.

* cited by examiner

*Primary Examiner* — Jeffrey T Carley
*Assistant Examiner* — Joshua D Anderson
(74) *Attorney, Agent, or Firm* — Wash Park IP Ltd.; John T. Kennedy

(57) ABSTRACT

A modified lug press and use thereof is described. The modified lug press includes a press and a cartridge. The press includes a drive which, when activated, crimps a lug, positioned on a die, to a wire. A cartridge holds the given lug and at least one additional lug, and successively aligns the given lug and the at least one next lug for insertion onto the die for crimping by the press. The cartridge includes a left rail, with a track therein, at least one middle rail, and a right rail. Distances between the rails may be adjustable. A drive motor, when activated, successively pushes lugs onto the die. A lug separator permits one lug to be pushed on the die at any given time. A lug placement device inhibit lateral lug movement during wire insertion and crimping operations.

17 Claims, 23 Drawing Sheets

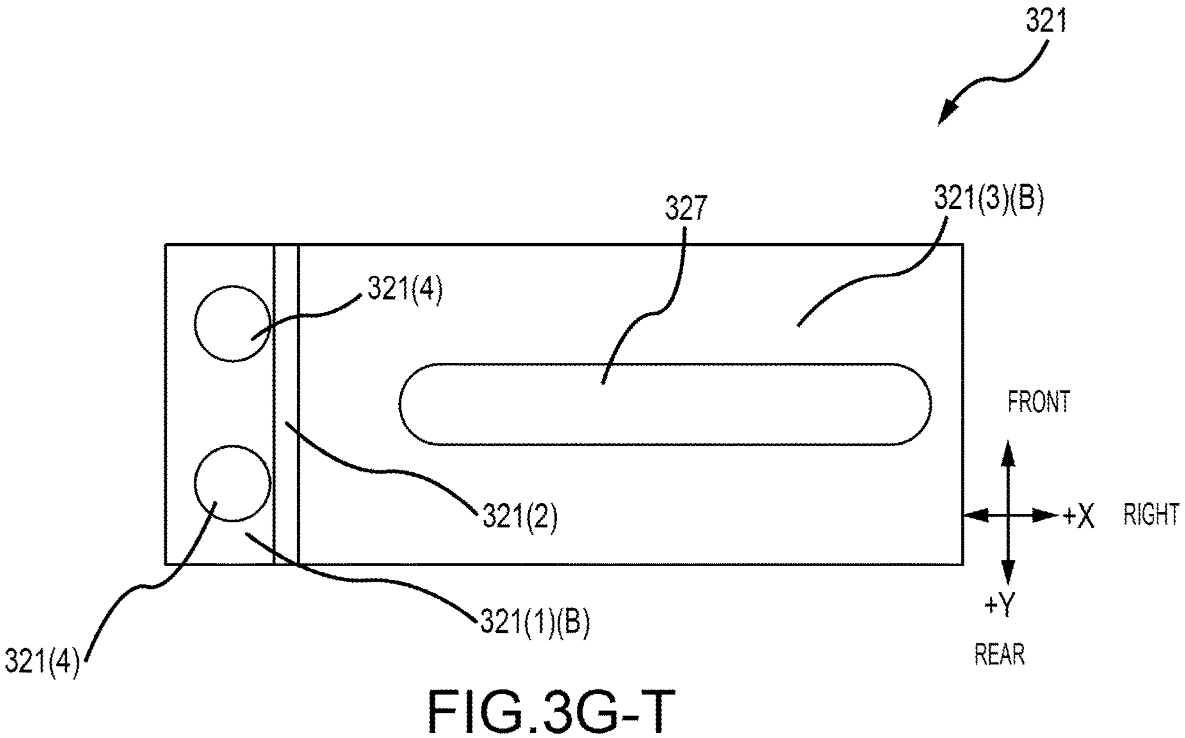
FIG.3G-T
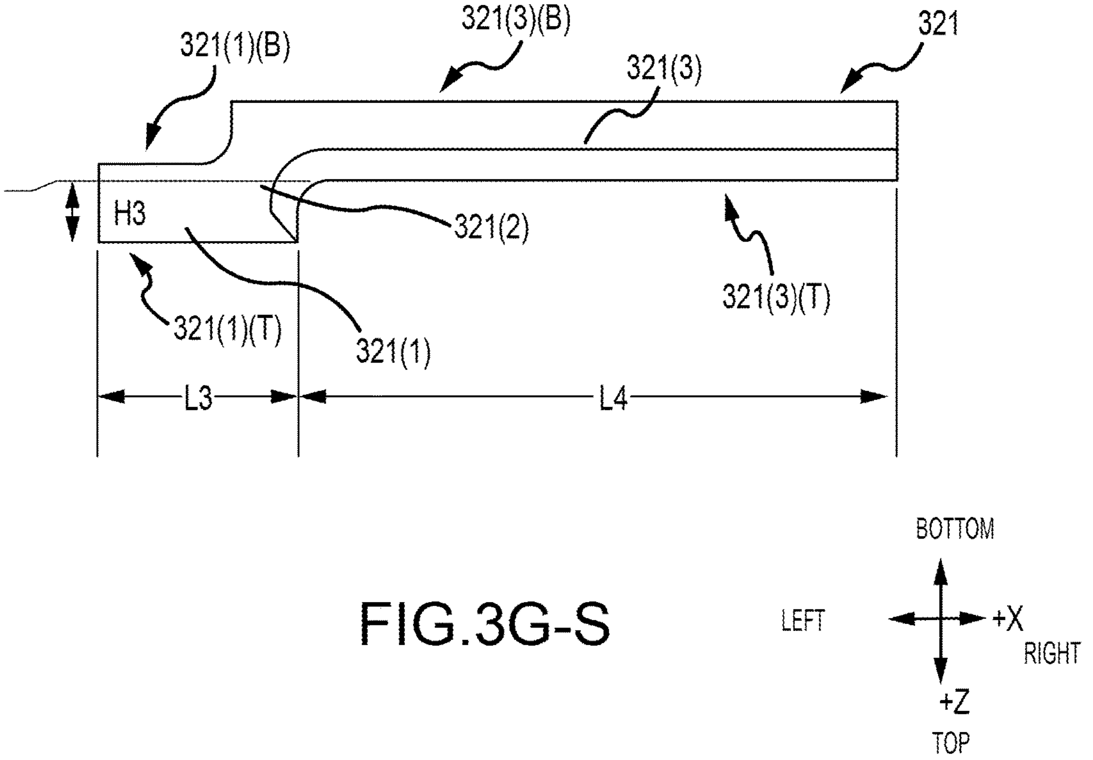
FIG.3G-S

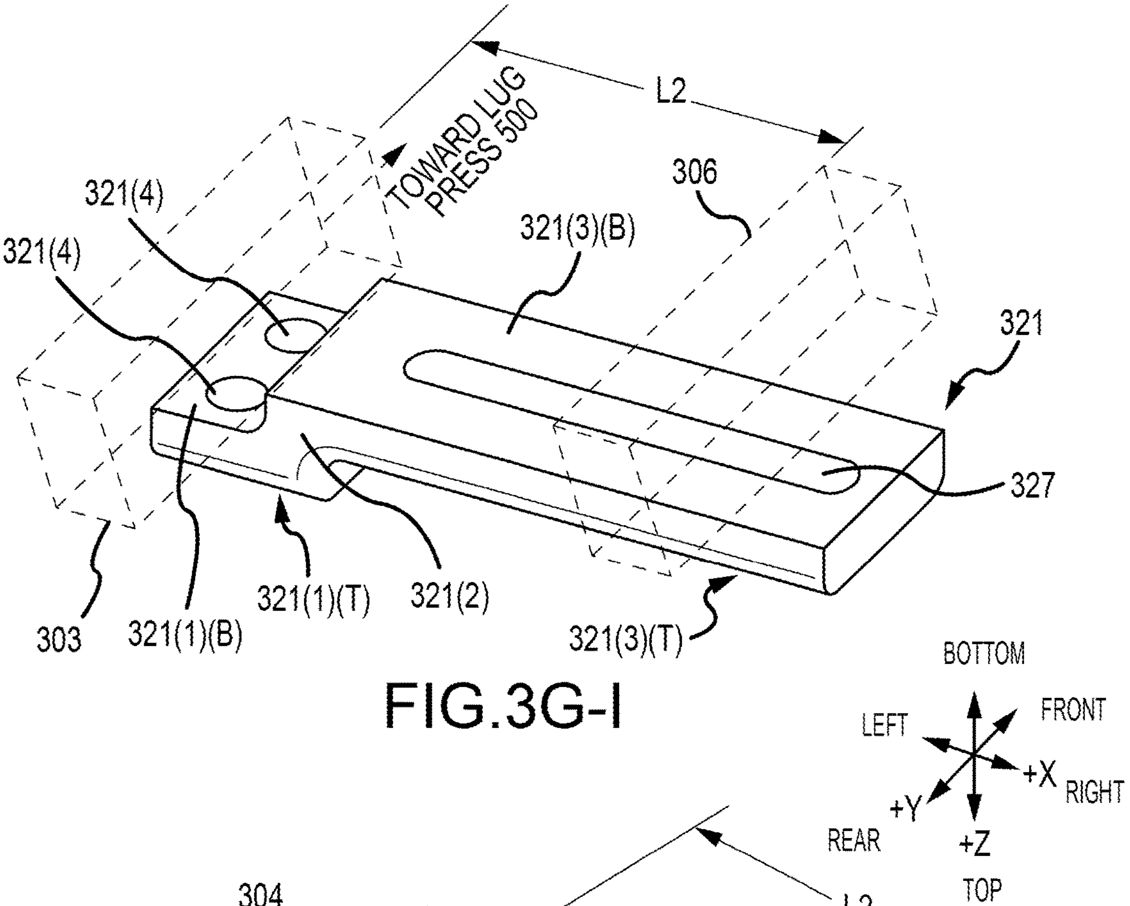
FIG.3G-I
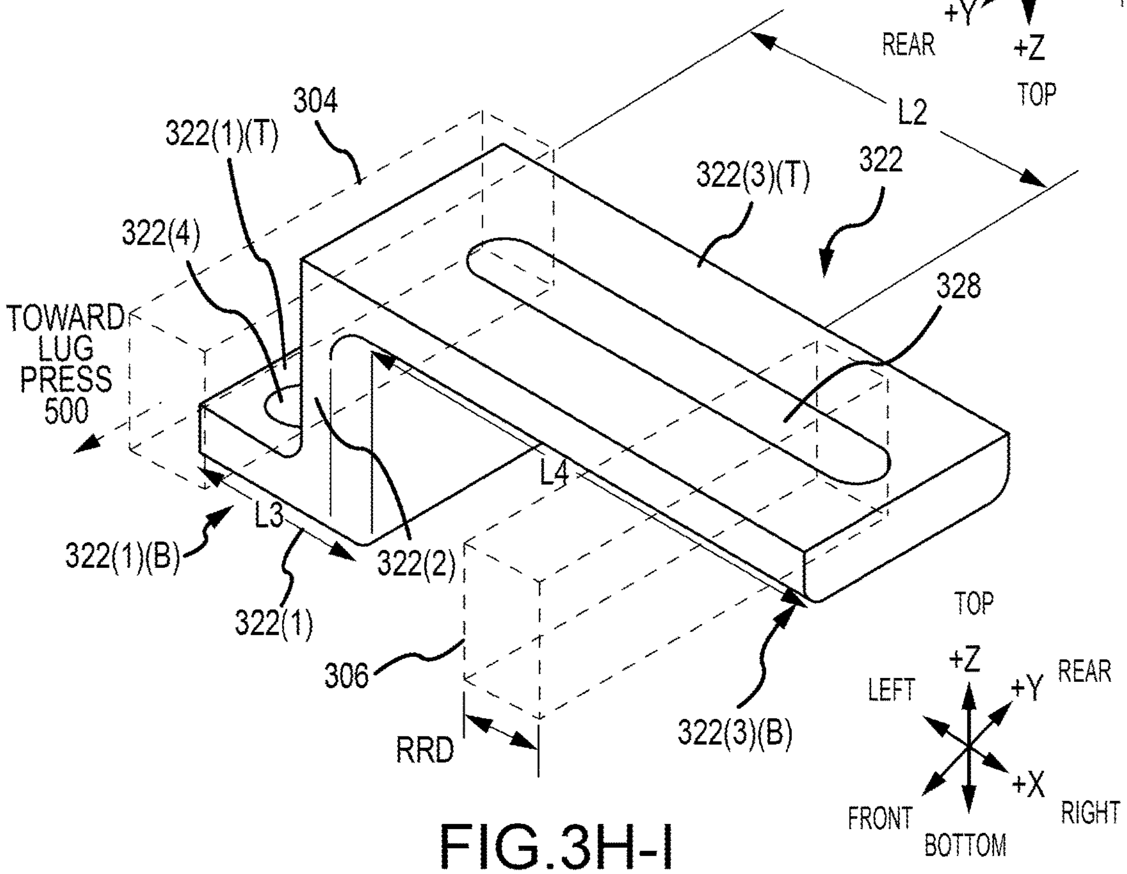
FIG.3H-I

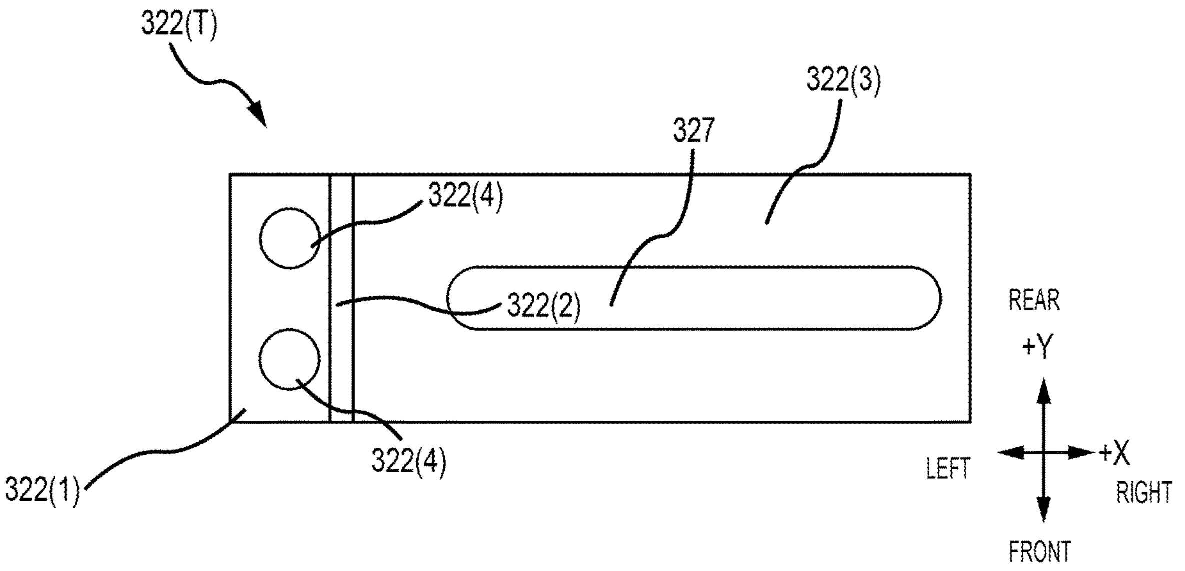
FIG.3H-T
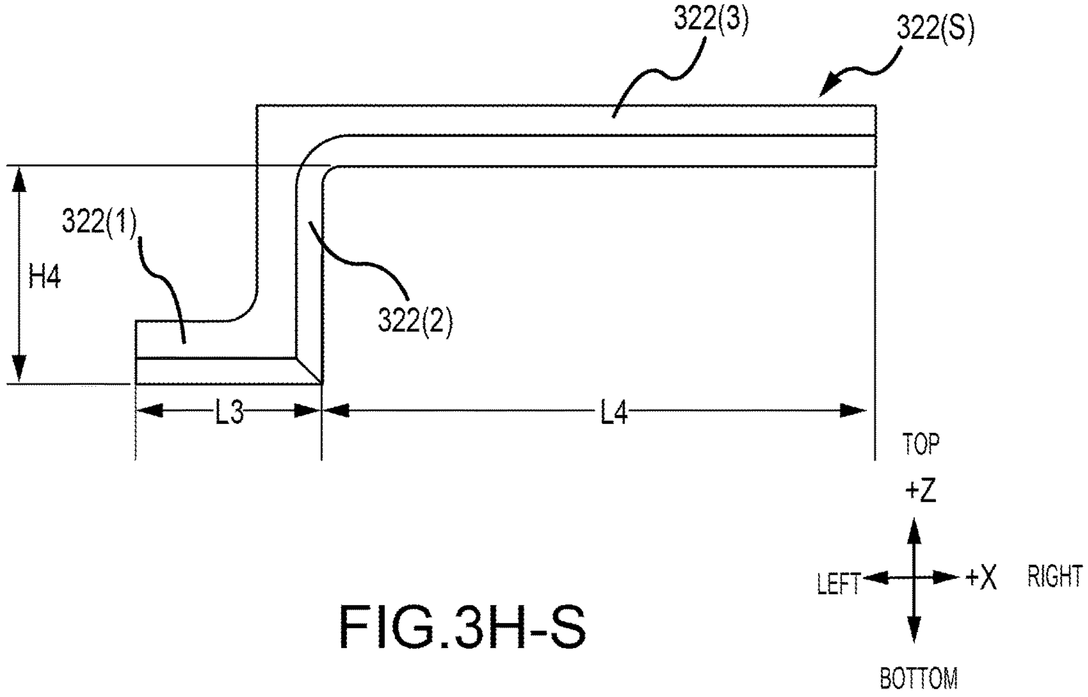
FIG.3H-S

MODIFIED LUG PRESS

TECHNICAL FIELD

The technology described herein generally relates to devices, system, and processes for crimping lugs onto wires.

BACKGROUND

Today, wires of varying gages are commonly crimped onto lugs of varying configurations to form a wire assembly. For example, a wire of any given gauge may be crimped onto a lug having a short barrel, a long barrel, a flat connector, an ninety degree (90°) connector, a forty-five degree (45°) connector, or otherwise. Commonly when many wires are to be crimped onto a corresponding number of lugs, a crimping machine (a.k.a., "lug press") may be utilized to form the wire assembly. A non-limiting example of a lug press is the BURNDY OEM840NCP, provided by Hubble Incorporated of Shelton, Connecticut, USA (herein, the "Burndy Lug Press"). More information about the Burndy Lug Press can be found at www.hubbell.com/burndy/en/Products/Power-Utilities/Tools-Dies-Accessories/Crimpers-Cutters/4-5-Ton-OEM-Pneumatic-Bench-Press-8-AWG-40-AWG/p/1944243, the entire contents of which are incorporated herein by reference.

Use of a lug press commonly involves an operator manually inserting a given lug into a die, inserting the wire into the lug, and then activating the lug press which thereby crimps the lug onto the wire. The combined lug and wire device is then removed from the lug press and the process is repeated for a next lug and wire combination. To prevent operator injury, a protective shield is commonly raised/lowered (or the like) on the lug press between crimping operations. Accordingly, many seconds are often expended between a crimping of a first wire onto a first lug and a crimping of a second wire onto a second lug. When hundreds to thousands of lugs are to be crimped onto wires, currently available lug press and methods of use thereof are time-intensive, operator intensive, and otherwise inefficient. Accordingly, a need exists for a modified lug press which facilitates the efficient and automated placement of multiple lugs, in sequence, into a lug press such that the lugs may be respectively crimped onto wires. The various implementations of the present disclosure address these and other needs.

SUMMARY

Various implementations are described of devices, systems, and processes for using a modified lug press system.

For at least one implementation, a modified lug press may include a lug press die; and a lug press drive. The lug press, when activated, crimps a given lug, positioned in the lug press die, to a given wire. The given lug may include: a lug connector portion and a lug barrel portion. The lug press also may include a lug cartridge holding the given lug and at least one additional lug, and successively aligning the given lug and the at least one next lug for insertion onto the lug press die. Upon insertion of the given lug, as aligned by the lug cartridge, onto the lug press die and activation of the lug press drive, the lug press crimps the given lug to the given wire.

For at least one implementation, the lug cartridge may include a left rail, at least one middle rail, and a right rail. The left rail may be separated from the at least one middle rail by a connector separation distance ("L1"). The at least one middle rail may be separated from the right rail by a barrel separation distance ("L2"). The lug connector portion may have a lug connector length ("L6") and, for at least one implementation, $L1 \approx L6$. The lug barrel portion may have a lug barrel length ("L8") and for at least one implementation, $L2 \approx L8$. For at least one implementation, at least one of L6 and L8 may vary from a first lug type to a second lug type. At least one of L1 and L2 may be adjustable based on a lug type for the given lug.

For at least one implementation, the left rail may include a left rail track having a left rail track height ("LRTH"). LRTH may be selected to accept an end of the lug connector portion having a lug connector thickness ("LCH").

For at least one implementation, the middle rail may include an upper middle rail and a lower middle rail. The upper middle rail and the lower middle rail may be commonly aligned in an upper and lower relationship with respect to each other. A middle rail gap ("MRG") separates the upper middle rail from the lower middle rail. For at least one implementation, $MRG > LCH$. For another implementation, $MRG = LCH$.

For at least one implementation, the lug connector portion has a lug connector length ("L6"). The left rail may has a left rail depth ("LRD") and the left rail track has a left rail track depth ("LRTD"). For at least one implementation, $LRD > LRTD$. For at least on implementation, $L6 \approx L1 + LRTD$.

For at least one implementation, a given lug may include a lug inner connector portion, having a lug inner connector length ("L7"). The lug inner connector portion couples the lug connector portion to the lug barrel portion. The lug barrel portion may have a lug barrel length ("L8"). For at least one implementation, $L2 > L8$. For at least one implementation, $L2 \approx L7 + L8$.

For at least one implementation, the right rail has a top surface and a bottom surface. A right rail adjustment device may include a top adjustment plate and a bottom adjustment plate. The top adjustment plate may be fastened to a top surface of an upper middle rail. The bottom adjustment plate may be fastened to a bottom surface of a lower middle rail. An adjustment bolt may extend through the top adjustment plate and the bottom adjustment plate. A tightening knob may be attached to the adjustment bolt and, for at least one implementation, positioned above the top adjustment plate. An adjustment nut may be attached to the adjustment bolt and, for at least one implementation, positioned below the bottom adjustment plate. The adjustment bolt, when tightened, applies pressure, via the tightening knob, the top adjustment plate, the bottom adjustment plate, and the adjustment nut, on the top surface and on the bottom surfaces of the right rail. The pressure, as applied, secures the right rail, relative to the upper middle rail and the lower middle rail. For at least one implementation, the right rail is secured at the barrel separation distance L2.

For at least one implementation, the top adjustment plate may include a top plate slot and the bottom adjustment plate may include a bottom plate slot corresponding to the top plate slot. The adjustment bolt may be moved along the top plate slot and the bottom plate slot to adjust the barrel separation distance L2.

For at least one implementation, a modified lug press may include a lug drive which sequentially pushes the at least one next lug along the lug cartridge and towards the lug press die. The at least one next lug may include, in sequence, a first lug and a second lug. The first lug may be positioned, at a given time, at a first location on the lug cartridge next to the given lug. The first location may be located at a location on the lug cartridge that may be behind a center line for a lug press die. The second lug may be positioned, at the given time, next to the first lug and at a second location on the lug cartridge. The second location may be further away from the lug press die than the first location.

For at least one implementation, the lug drive may include a lug drive motor, a lug drive motor shaft, and a lug drive wheel. The lug drive motor shaft extends from the lug drive motor to the lug drive wheel and operatively connects the lug drive wheel to the lug drive motor. The lug drive wheel may be positioned to contact the second lug when the second lug is located at the second location on the lug cartridge.

The lug drive motor, when activated, initiates a lugh pushing action by rotating the lug drive shaft and the lug drive wheel. The lug pushing action facilitates direct pushing of the second lug towards the first lug and indirect pushing of the first lug onto the lug press die.

For at least one implementation, the cartridge may include a third lug. The third lug may be positioned, at the given time, next to the second lug and at a third location on the lug cartridge. The third location may be further away form the lug press die than the second location. Upon activation of the lug drive motor and the pushing of the second lug towards the first lug, the second lug moves into the first location and the third lug moves into the second location. Gravitational forces may move the third lug from the third location to the second location.

For at least one implementation, a modified lug press may include a lug separator. The lug separator may include a lug separator actuator, a lug separate plate, and a lug sensor. The lug separator may be configured to prevent the first lug from pushing the given lug off the lug press die after activation of the lug drive motor and before crimping of the given wire to the given lug during activation of the lug press drive.

For at least one implementation, a modified lug press may include a lug placement device. The lug placement device may include a placement motor, a placement motor positioning shaft, and a placement motor positioning pad. The placement motor positioning shaft couples the placement positioning pad to the placement motor. The lug placement device, when the placement motor is activated, applies pressure on the given lug which inhibits dislodging of the given lug from the lug press die when the given wire is inserted into the given lug and when the lug press drive crimps the given lug to the given wire.

For at least one implementation, a left rail may include a left rail opening. When the placement motor is activated, the placement positioning pad may be extended through at least a portion of the left rail opening until contact may be made between the placement positioning pad and an edge of the lug connector portion.

For at least one implementation, a modified lug press may include a lug press die and a lug press drive. The modified lug press may include a lug placement device that includes a placement positioning pad. The modified lug press may include a lug drive that includes a lug drive wheel. The modified lug press may include a lug separator that includes a lug separator plate. The modified lug press may include a controller coupled to the lug press, the lug placement device, the lug drive and the lug separator. The controller facilitates crimping of a given lug onto a wire by instructing the modified lug press to perform operations including: instructing the lug separator to retract the lug separator plate; instructing the lug drive to push a given lug onto a lug press die; instructing the lug separator to extend the lug separator plate; instructing the lug placement device to extend the placement positioning pad until contact may be made between the placement positioning pad and a connector portion of the given lug which inhibits lateral movement of the given lug relative to the lug press die when the wire may be inserted into a barrel portion of the given lug; instructing insertion of the wire into the barrel portion of the given lug; and instructing the lug press to activate the lug press drive. Upon activation of the lug press drive, the given lug may be crimped to the wire forming a given wire assembly. Operations for the modified lug press also may include instructing the lug press to deactivate the lug press drive; instructing removal of the given wire assembly from the lug press; instructing the lug placement device to retract the placement positioning pad; and repeating the operations for a next lug. For at least one implementation, the modified lug press may include a lug cartridge. The lug cartridge may include rails in which multiple lugs may be stored and sequentially and successively fed onto the lug press die.

For at least one implementation, a process for crimping a lug onto a wire may include operations including configuring rails of a lug cartridge for storing multiple lugs of a given lug type; extending a lug separator plate which, when extended separates, for the multiple lugs, a given lug from a next lug, when the given lug may be located on a lug press die of a lug press; inserting multiple lugs into the lug cartridge; retracting the lug separator plate; activing a lug drive which pushes the given lug onto the lug press die; upon detecting positioning of the given lug on the lug press die, extending the lug separator plate; activating a lug placement motor which inhibits lateral movement of the given lug on the lug press die; inserting a given wire into the given lug; activing a lug press drive, of the lug press, which crimps the given lug onto the given wire to form a wire assembly; deactivating the lug press drive; deactivating the lug placement motor; and removing the wire assembly from the lug press.

BRIEF DESCRIPTION OF THE DRAWINGS

The features, aspects, advantages, functions, modules, and components of the devices, systems and processes provided by the various implementations of implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

FIG. 3G-I is an isometric view of a top adjustment plate of a 2' adjustment device of the lug cartridge device of FIG. 3A, as configured for use with the lug press of FIG. 1A, and in accordance with at least one implementation of the present disclosure.

FIG. 3G-T is a top view of the top adjustment plate of FIG. 3G-I, as configured for use with the lug press of FIG. 1A, and in accordance with at least one implementation of the present disclosure.

FIG. 3G-S is a side view of the top adjustment plate of FIGS. 3G-I and 3G-T, as configured for use with the lug press of FIG. 1A, and in accordance with at least one implementation of the present disclosure.

FIG. 3H-I is an isometric view of a bottom adjustment plate of a 2' adjustment device of the lug cartridge device of FIG. 3A, as configured for use with the lug press of FIG. 1A, and in accordance with at least one implementation of the present disclosure.

FIG. 3H-T is a top view of the bottom adjustment plate of FIG. 3H-I, as configured for use with the lug press of FIG. 1A, and in accordance with at least one implementation of the present disclosure.

FIG. 3H-S is a side view of the bottom adjustment plate of FIGS. 3H-I and 3H-T, as configured for use with the lug press of FIG. 1A, and in accordance with at least one implementation of the present disclosure.

DETAILED DESCRIPTION

Figure 1A:
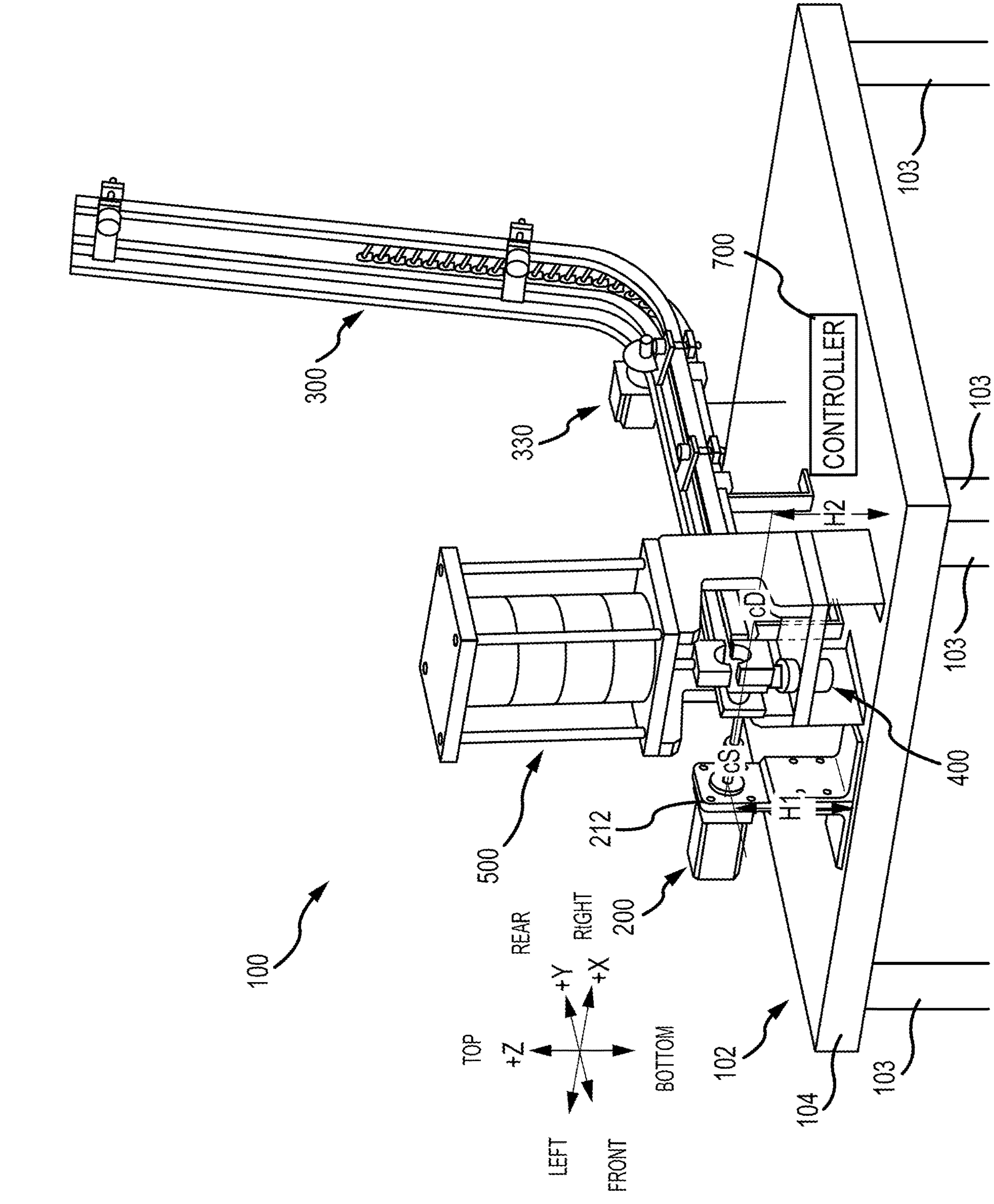
FIG. 1A is a simplified front-right isometric view of a modified lug press, and in accordance with at least one implementation of the present disclosure.

Devices, systems and processes for crimping a lug to a wire are described herein. For at least one implementation, a modified lug press may be used for crimping a lug onto a wire and may include use of a Burndy Lug press or other commonly known lug press. Other known or later arising lug presses may be used with various implementations of the present disclosure.

As shown in FIGS. 1A-1F, a modified lug press 100 having a "standard orientation" may include a work stand 102, a lug placement device 200, a lug cartridge 300, a lug drive 330, a lug separator 400, a lug press 500, and a controller 700. The modified lug press 100 may be configured to sequentially crimp a given lug 600 to a given wire (not shown).

More specifically, and as shown in FIGS. 1A-1F for at least one implementation, the work stand 102 may include one or more legs 103 (such as the four legs shown), and a top surface 104. In other implementations, a work stand 102 may be provided on a suspended shelf, from a vehicle tailgate, or otherwise. Any structure suitable for supporting the modified lug press 100 may be used in a given implementation of the present disclosure. For at least one implementation, one or more of the lug placement device 200, lug cartridge 300, lug drive 330, lug separator 400, and the lug press 500 may be secured to the top surface 104 of the work stand 102. The length and width of the top surface 104 is herein used for description purposes as a reference plane defining an X-Y-Z coordinate system. Further, the various sides, surfaces and positional relationships for the various elements of the lug press 100 can be further identified and referenced with respect to a common referencing scheme that includes a front side, a left side, a right side, a rear side, a top side, and a bottom side of a given element of the lug press 100.

Lug Placement Device 200

Figure 1B:
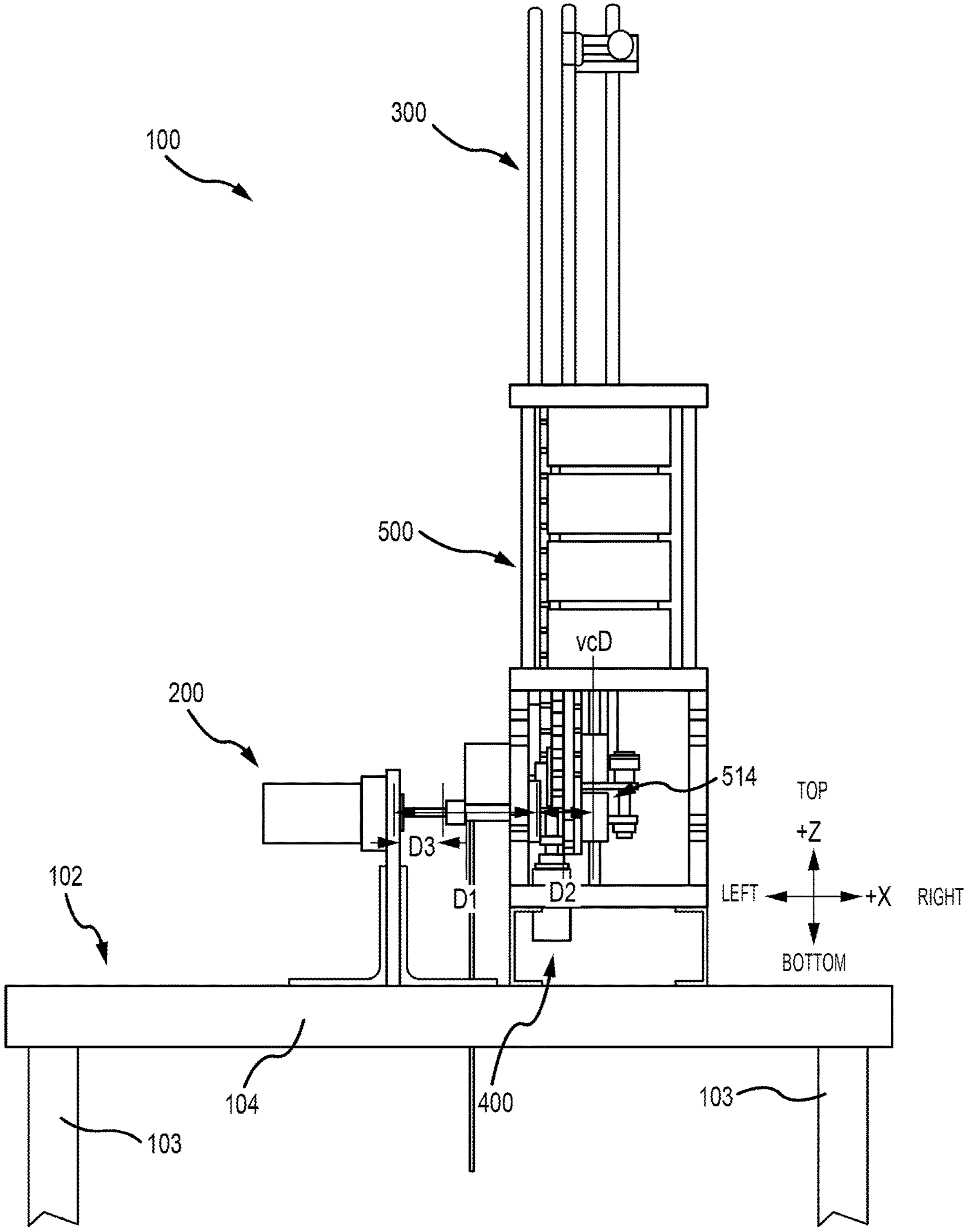
FIG. 1B is a front view of the modified lug press of FIG. 1A, and in accordance with at least one implementation of the present disclosure.
Figure 1C:
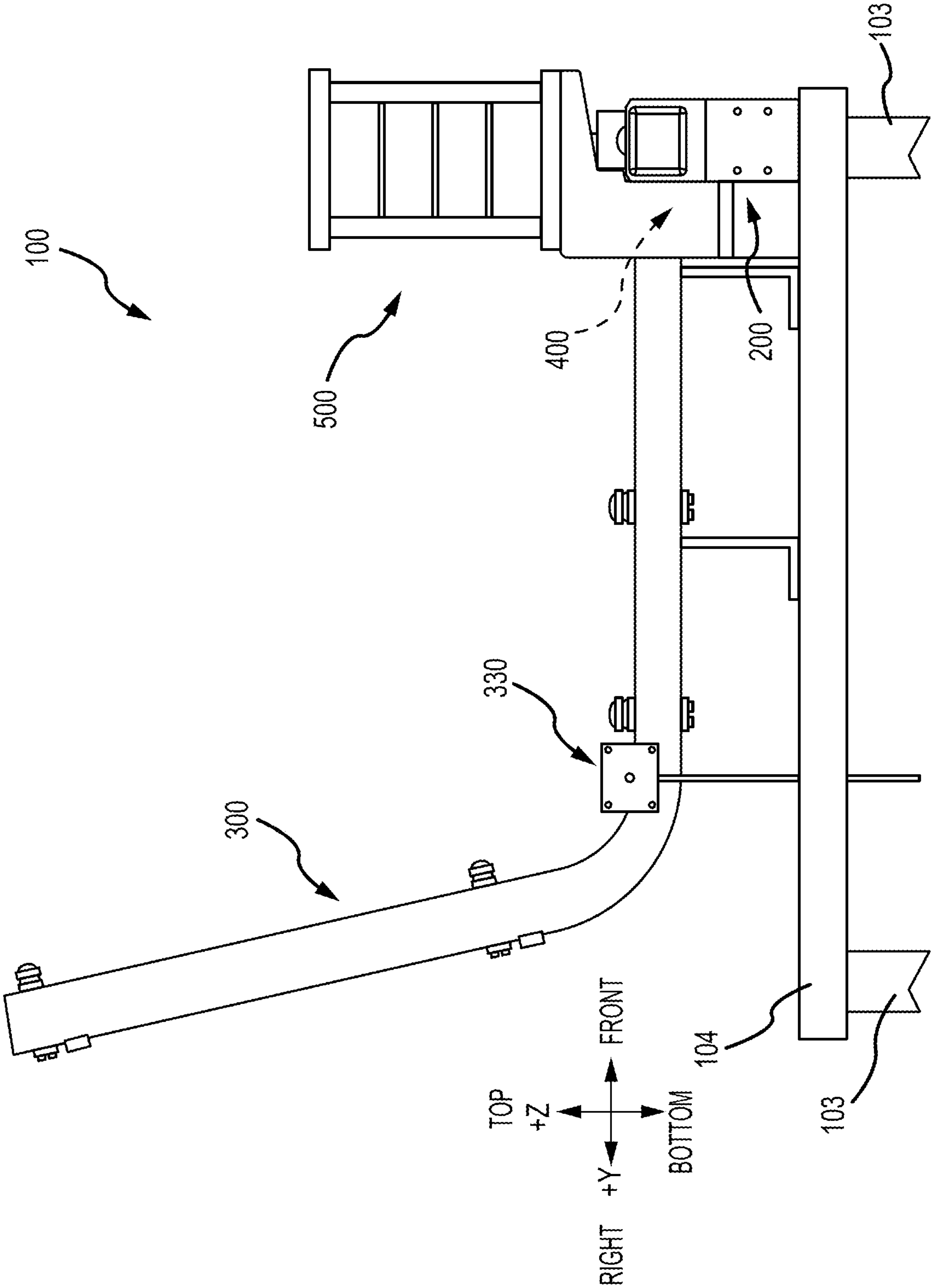
FIG. 1C is a left view of the modified lug press of FIG. 1A, and in accordance with at least one implementation of the present disclosure.
Figure 1D:
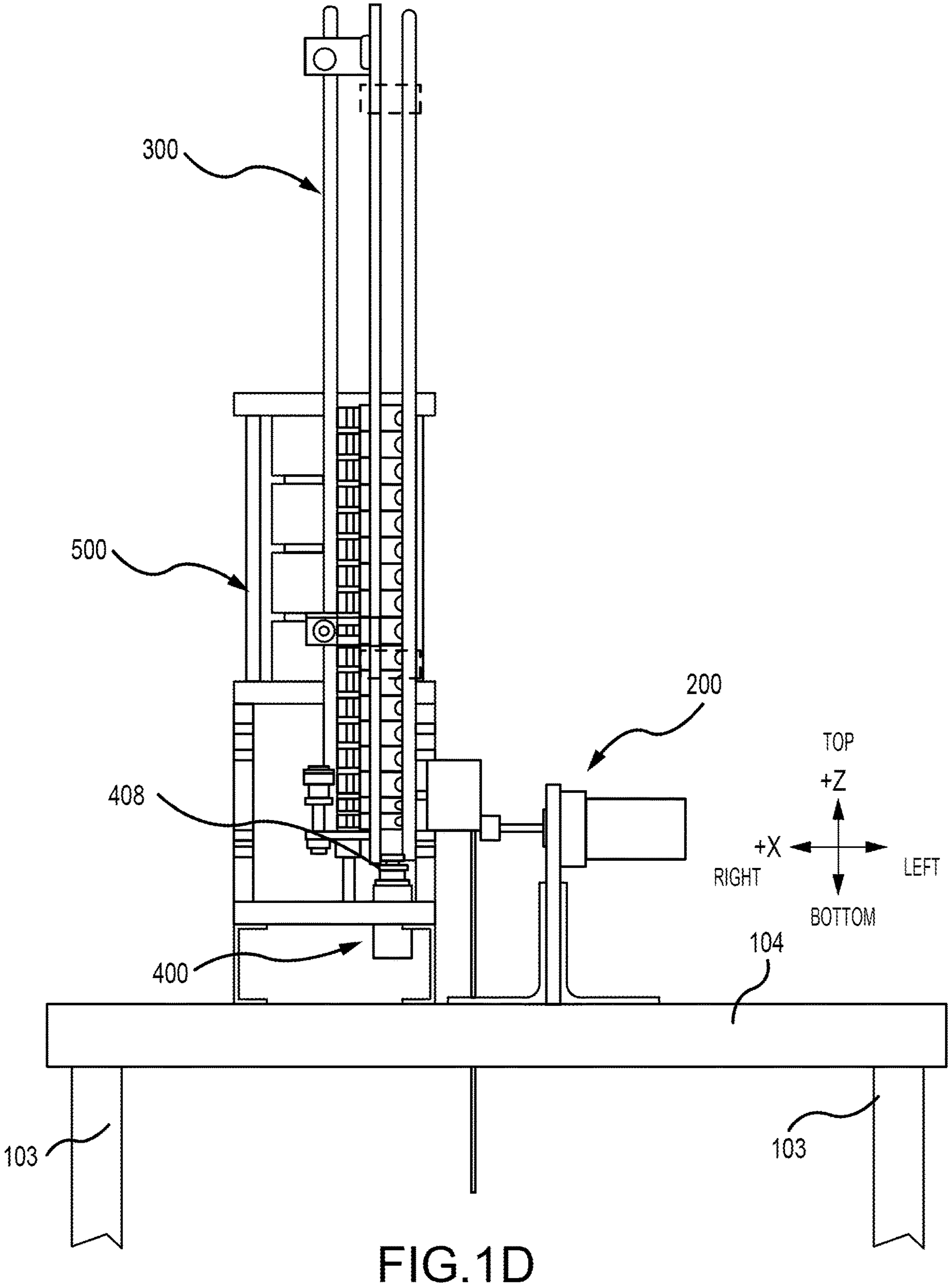
FIG. 1D is a back view of the modified lug press of FIG. 1A, and in accordance with at least one implementation of the present disclosure.
Figure 1E:
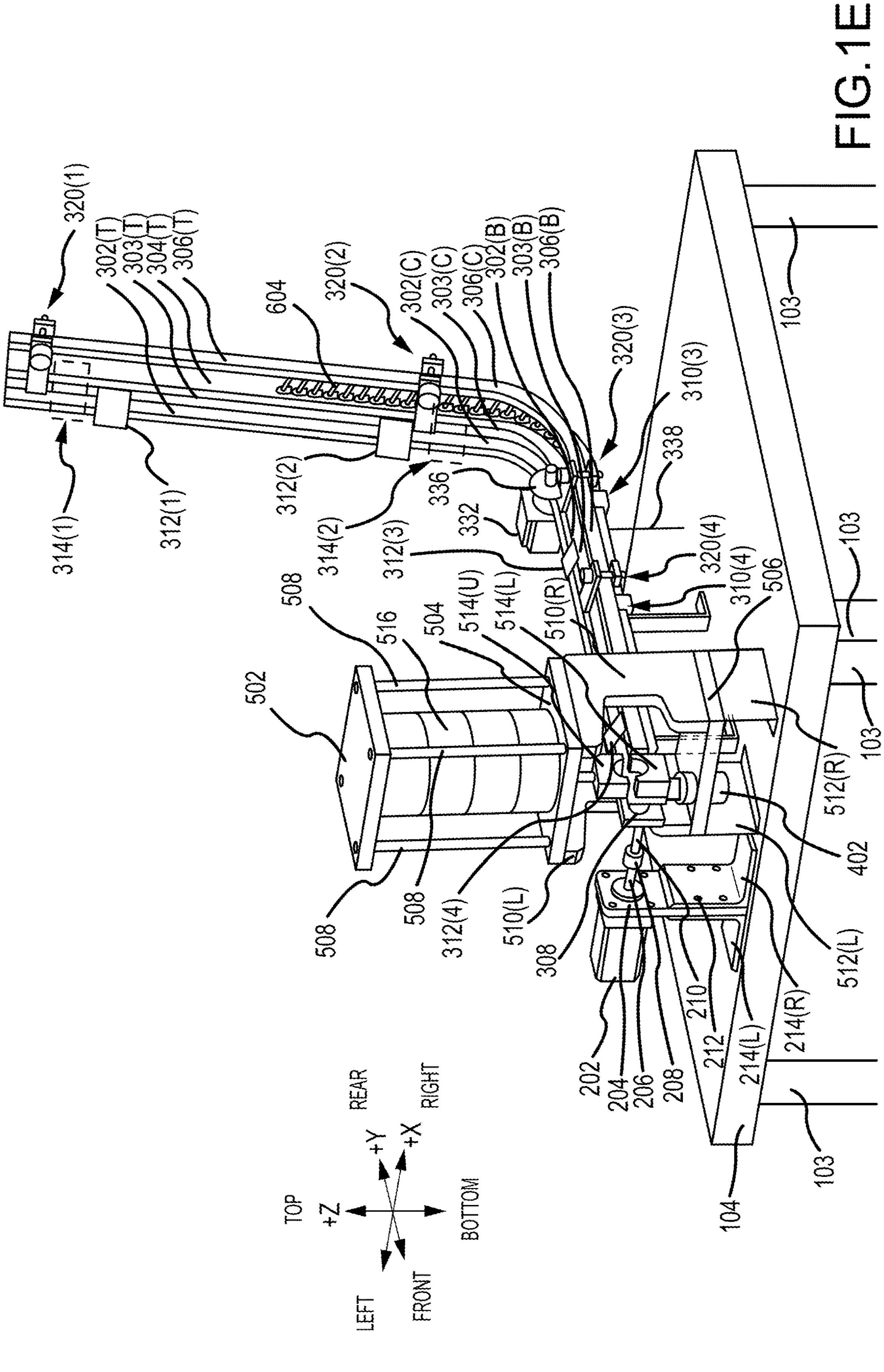
FIG. 1E is a detailed front-right isometric view of the lug press of FIG. 1A, and in accordance with at least one implementation of the present disclosure.
Figure 1F:
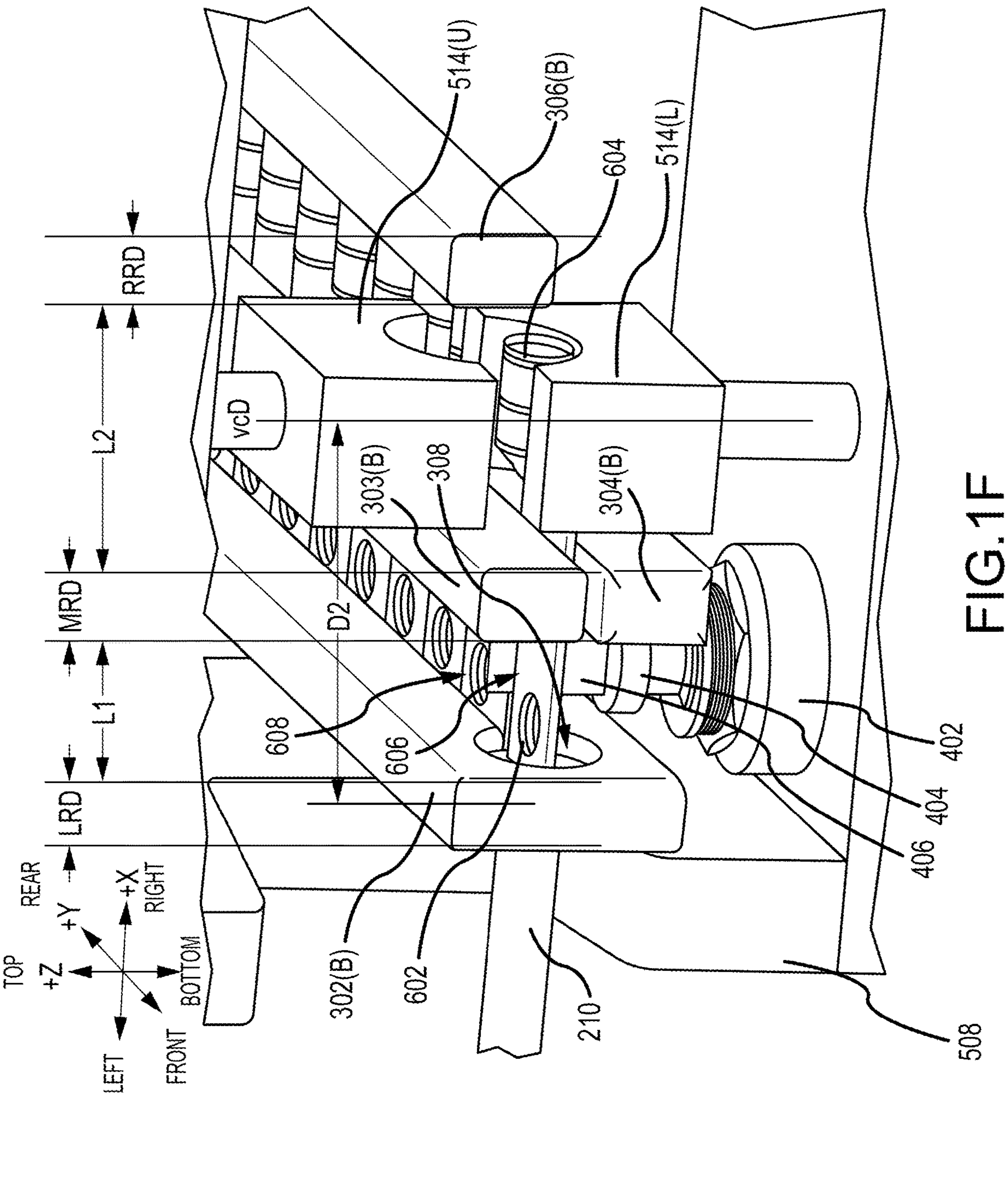
FIG. 1F is a close-up of a portion of the front-right isometric view of the lug press of FIGS. 1A and 1B, and in accordance with at least one implementation of the present disclosure.
Figure 2A:
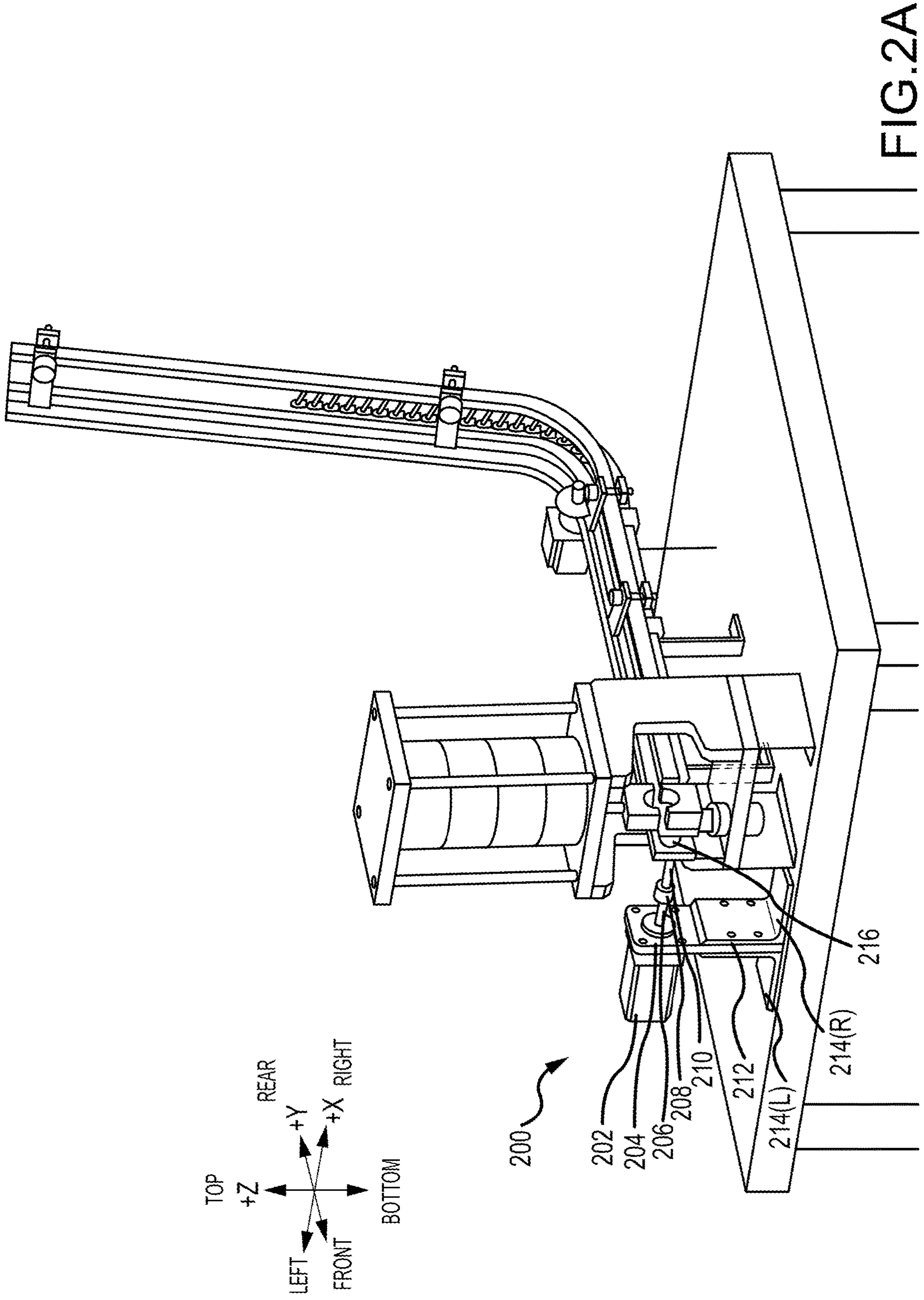
FIG. 2A is a front-right isometric view of a lug placement device, configured for use with the lug press of FIG. 1A, and in accordance with at least one implementation of the present disclosure.
Figure 2B:
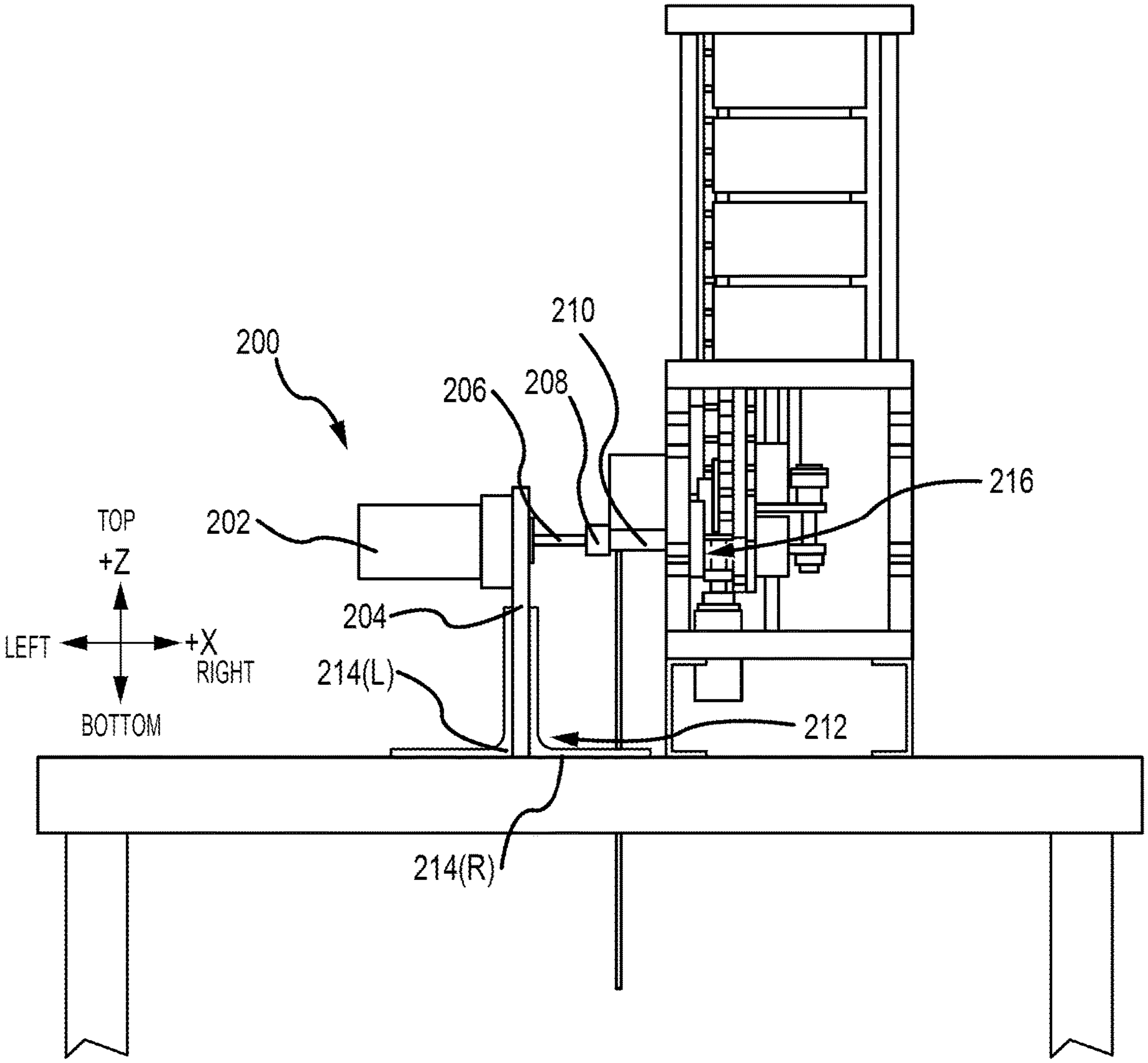
FIG. 2B is a front view of the lug placement device of FIG. 2A, as configured for use with the lug press of FIG. 1A, and in accordance with at least one implementation of the present disclosure.
Figure 2C:
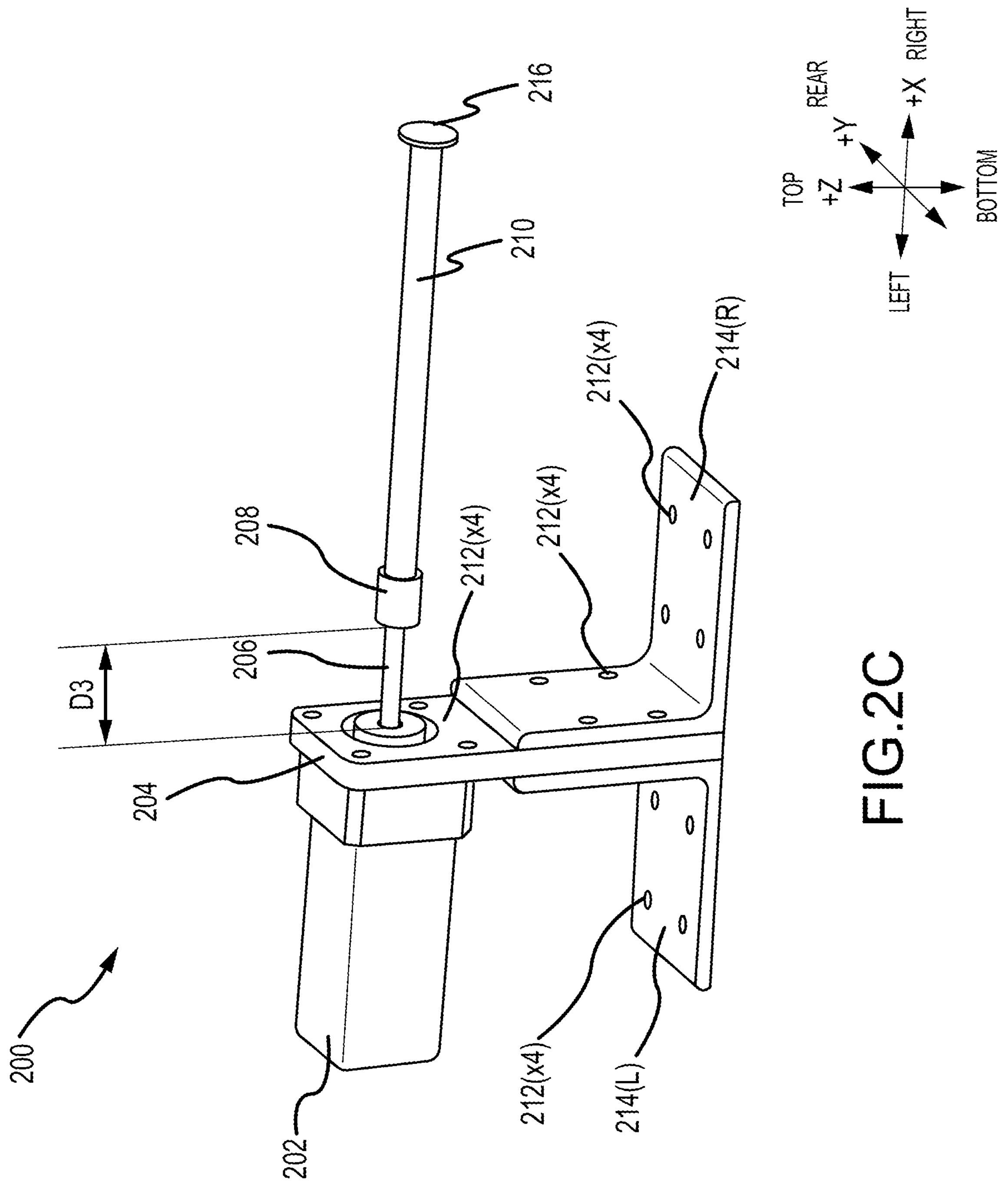
FIG. 2C is an isometric view of the lug placement device of FIG. 2A, as configured for use with the lug press of FIG. 1A, in and in accordance with at least one implementation of the present disclosure.

As shown in FIGS. 1A-1F and as more specifically shown in FIGS. 2A-2C for at least one implementation a lug placement device 200 may be positioned, according to the standard orientation, on a left side of a lug press 500 (as shown, e.g., in FIGS. 1B and 2B). For another implementation, the lug placement device 200 may be positioned, in an "alternative orientation" (not shown), on the right side of the lug press 500. While the description of various implementations herein is provided with respect to the standard orientation, it is to be appreciated that such descriptions may also be applied to an alternative orientation, or any other orientation of the various elements of the present disclosure.

When the lug placement device 200 is positioned according to the standard orientation an operator may insert, from the right of the lug press 500, a wire into a lug 600 positioned within the lug press 500. When the lug placement device 200 is positioned according to the alternative orientation, a wire may be inserted from the left of the lug press 500 and into a lug 600 positioned therein.

The lug placement device 200 facilitates various operational characteristics of the modified lug press 100 including, but not limited to: specific placement of a given lug 600 onto a lug press die 514 provided with a lug press 500 (as discussed below and shown in FIGS. 5A and 5B); insertion of a given wire into the so placed given lug 600 without inducing lateral (right-to-left for the standard orientation or right-to-left for the alternative orientation, where left and right are determined from a perspective of an operator looking directly onto a front of the modified lug press 100) movement of the given lug 600 relative the lug press die 514; specific placement of the lug 600 in the lug press die 514 while crimping occurs—thereby resulting in the crimping occurring in a given flattening of a lug barrel portion 604 of the lug 600 (as shown, e.g., in FIG. 1F) in accordance with a pattern for a given lug press die 514; crimping of a next lug 600 onto a next wire occurring without requiring removal of safety shields; and the like.

For at least one implementation, a lug placement device 200 may include a placement motor 202, a placement motor plate 204, a placement motor shaft 206, a placement motor adjustment nut 208, a placement motor positioning shaft 210, fasteners 212, a placement motor stand 214, and a placement positioning pad 216.

For a non-limiting implementation, the placement motor 202 may be a servo driven actuator motor. The placement motor 202 may coupled to a placement motor plate 204. The placement motor plate 204 may have any configuration which establishes a vertical position, in a three-axis orientation system, of a shaft center line (as indicated in FIG. 1A by shaft center line "cS") of the placement motor shaft 206 relative to a die center line (as indicated in FIG. 1A by die center line "cD") of a given die 514 placed into the lug press 500. The shaft center cS may be a first height "H1" above the top surface 104 (H1 being measured at the right edge of the placement motor 202 and where an external portion of the placement motor shaft 206 first extends from a housing within the placement motor 202. The die center line cD may be a second height "H2" above the top surface 104, with the top surface 104 forming a reference plane (RP) from which other measurements may be made and in accordance with other implementations of the present disclosure. For at least one implementation, H1=H2. For at least one implementation, the shaft center line cS may be parallel to the die center line cD which is further parallel to the reference plane RP. For at least one implementation, the shaft center line cS may be non-parallel with the die center line cD, with the die center line cD being parallel to the reference plane RP. For implementations, H1< or >H2, with H1 varying by a configuration of a type of lug to be crimped by the modified lug press 100. For a non-limiting example, a lug may have a lug connector portion 602 that is non-parallel with a lug barrel portion 604. Accordingly, the shaft center line cS may have a height H1 that is above, below, parallel to, or at an angle relative to the die center line cD, which is at a height H2.

Further, a center line for a lug press die 514 may vary from a center line for a another lug press die 514. Such variance may arise from a type of lug 600 to be used, the lug press die 514 to be used for the given lug 600, or otherwise. Accordingly, for at least one implementation, H2 may vary with variances of H1. For at least one implementation, the vertical position of the placement motor 202 and the placement motor shaft 206 may be fixed or adjustable. For an adjustable placement motor shaft vertical position implementation, vertical adjustments may occur manually, semi-automatically, or automatically. For example, a vertical position of the placement motor 202 and thereby the placement motor shaft 206 may include use of a placement motor plate 204 that facilitates variances in H1 as variances in a cS may occur with use of varying lug types, varying lug press dies 514, combinations thereof, and otherwise.

For at least one implementation, the placement motor plate 204 may be fastened to the placement motor 202 using one or more fasteners 212. For a given implementation, a fastener 212 may include, but is not limited to, one or more screws, nuts and bolts, rivets, welds, adhesives, or the like.

For at least one implementation, the placement motor plate 204 may be coupled to a placement motor stand 214 by one or more fasteners 212. For another implementation, the placement motor stand 214 may be integrated with the placement motor plate 204. As shown in FIGS. 2A to 2C, the placement motor stand 214 may include a left placement motor stand 214(L) and a right placement motor stand 214(R). For another implementation, a placement motor stand 214 may include one of the left placement motor stand 214(L) or the right placement motor stand 214(R). The placement motor stand 214 may be fastened to the top surface 104 using one or more fasteners 212.

As shown for at least one implementation, a placement motor positioning shaft 210 may be coupled to the placement motor shaft 206. The placement motor positioning shaft 210 may be coupled to a placement positioning pad 216. The placement positioning pad 216 may be fastened to the placement motor positioning shaft 210 (or directly to the placement motor shaft 206 when the placement motor positions shaft 210 is not used). The placement positioning pad 216 may have any size and/or configuration and may vary based on a given lug 600 to be crimped to a given wire. For at least one implementation, the placement positioning pad 216 may be a substantially flat surface oriented in a substantially vertical direction relative to the reference plane RP. For another implementation, the placement positioning pad 216 may be configured to have an angle that corresponds to a non-vertical orientation. For another implementation, the placement positioning pad 216 may be coupled to the placement motor positioning shaft 210 (or the the placement motor shaft 206) at a variable orientation.

For at least one implementation, the placement positioning pad 216 may have a contour, edges, or other shape configurations which correspond to a given lug 600. For example, a lug 600 having an angled lug connector portion 602 (relative to a lug barrel portion 604 thereof) may include one or more edges which facilitate the securing of the lug 600, while positioned in the lug press die 514, from movement in a lateral, vertical or other direction when a wire is inserted into the lug barrel portion 604.

The placement motor positioning shaft 210 may slidable engage with the placement motor shaft 206 and may be secured thereto by tightening of a placement motor adjustment nut 208 or by other fastening (e.g., by use of a cotter pin). As shown in FIG. 1B, a placement positioning pad 216 may be secured at a first distance "D1" from a right edge of the placement motor 202 and a second distance "D2" from a die vertical center line "vcD" for a lug press die 514 positioned in the lug press 500. The first distance D1 may vary, for a given lug press die 514, by loosening of the placement motor adjustment nut 208, slidably moving the placement motor positioning shaft 210 (and the placement positioning pad 216 therewith) along the shaft center line cS until a given location of the placement positioning pad 216 along the placement motor shaft 206 is obtained, and then by tightening of the placement motor adjustment nut 208 to secure the placement motor positioning shaft 210 to the placement motor shaft 206. It is to be appreciated that adjustments in D1 may be needed based on a length of a given lug connector portion 602 for a given lug 600. Adjustments to D2 may be accomplished by retraction and extension of the placement motor shaft 206 (and thereby retraction of the placement positioning pad 216). While a lug 600 is being inserted into a lug press die 514, the placement positioning pad 216 may be retracted towards the placement motor 202 a placement distance "D3" such that the placement positioning pad 216 is at a distance of D2+D3. The placement motor 202 may then extend the placement motor shaft 206 the distance D3 such that the distance D2 is achieved between the left edge of a lug connector portion 602 of a given lug 600 and the vertical center line vCD of a given lug press die 514 then situated in the lug press 500. The wire (not shown) may then be inserted into the lug 600, the lug press 500 activated, and the lug 600 crimped onto the wire.

For at least one implementation, the lug placement device 200 may not include a placement motor position shaft 210 or a placement motor adjustment nut 208. For such an implementation, the placement positioning pad 216 may be directly secured to the placement motor shaft 206.

In a first mode of operation and for when a lug cartridge 300 is first aligned with a lug press 500, operations may include an operator manually adjusting (e.g., by sliding, rotation, or the like) the placement motor positioning shaft 210 along the placement motor shaft 206 until the first distance D1 is obtained. The operations may also include the the controller 700 instructing the lug placement device 200 to obtain a configuration where D2 is set. It is to be appreciated that adjustments to D1 or D2 may occur in any order.

In a second mode of operation and for when a lug cartridge 300 is first aligned with a lug press 500, the controller 700 may instruct the lug placement device 200 to adjust D2 by a (by extension or contraction) of the placement motor shaft 206 by all or a portion of D3 and without adjustments being made to D1.

In a third mode operation, where multiple lugs 600 are loaded into a lug cartridge 300 and the first mode of operation has been accomplished, to successively crimp the lugs 600 to the wires, after a lug 600 has been crimped to a wire (and the so crimped lug and wire removed from the lug press 500), the controller 700 may instruct the lug placement device 200 to first retract the placement motor shaft 206 by all or portion of D3, and after a next lug 600 has been placed in the lug press die 514, second extend the placement motor shaft 206 by some or all of D3. By extending the placement motor shaft 206, a horizontal (left to right) pressure may be applied on the lug 600 and thereby facilitating positioning of the lug 600 with in the lug press die 514 to facilitate proper alignment of the lug 600 in the lug press die 514 when at least one of the wire is inserted into the lug 600 and when crimping of the lug 600 onto the wire occurs.

For an implementation, the lug placement device 200 may be configured for use with a lug 600 having an angled connector portion, wherein the angle is relative to a flat lug barrel portion 604. For example and not by limitation, a lug 600 may have a lug connector portion 602 that is angled, in whole or in part, at ninety degrees (90°) relative to a lug barrel portion 604 of the lug 600. For other implementations, other angles may be utilized. To accommodate lugs having an angled lug connector portion 602, the lug placement device 200 may be configured to include a position positioning pad 216 that corresponds to a given configuration for a given lug 600.

The lug placement device 200 may be configured to provide a fixed left surface which facilitates placement of a given lug 600 into a lug press die 514 of a lug press. When the lug placement device 200 applies pressure on a given lug 600, lateral movement of the lug 600, if any, is substantially eliminated.

For at least one implementation of a modified lug press 100 where a lug cartridge 300 is configured to accept lugs 600 having a predetermined configuration, length, and the like, the lug cartridge 300 may prevent horizontal and other movements of a lug 600 when a wire is inserted therein and a lug placement device 200 may not be utilized.

Lug Cartridge 300

As shown in FIGS. 1A-1F and as more specifically shown in FIGS. 3A-3F for at least one implementation a lug cartridge 300 may be positioned on a rear (or back) side of the lug press 500. A lug cartridge 300 may include a left rail 302, an upper middle rail 303, a lower middle rail 304, and a right rail 306. The left rail 302 may include a left rail top section 302(T), a left rail center section 302(C), and a left rail bottom section 302(B). The upper middle rail 303 may include an upper middle rail top section 303(T), an upper middle rail center section 303(C), and an upper middle rail bottom section 303(B). The lower middle rail 304 may include a lower middle rail top section 304(T), a lower middle rail center section 304(C), and a lower middle rail bottom section 304(B). The right rail 306 may include a right rail top section 306(T), a right rail center section 306(C), and a right rail bottom section 306(B). Each of the rails have top and bottom surfaces.

Figure 3A:
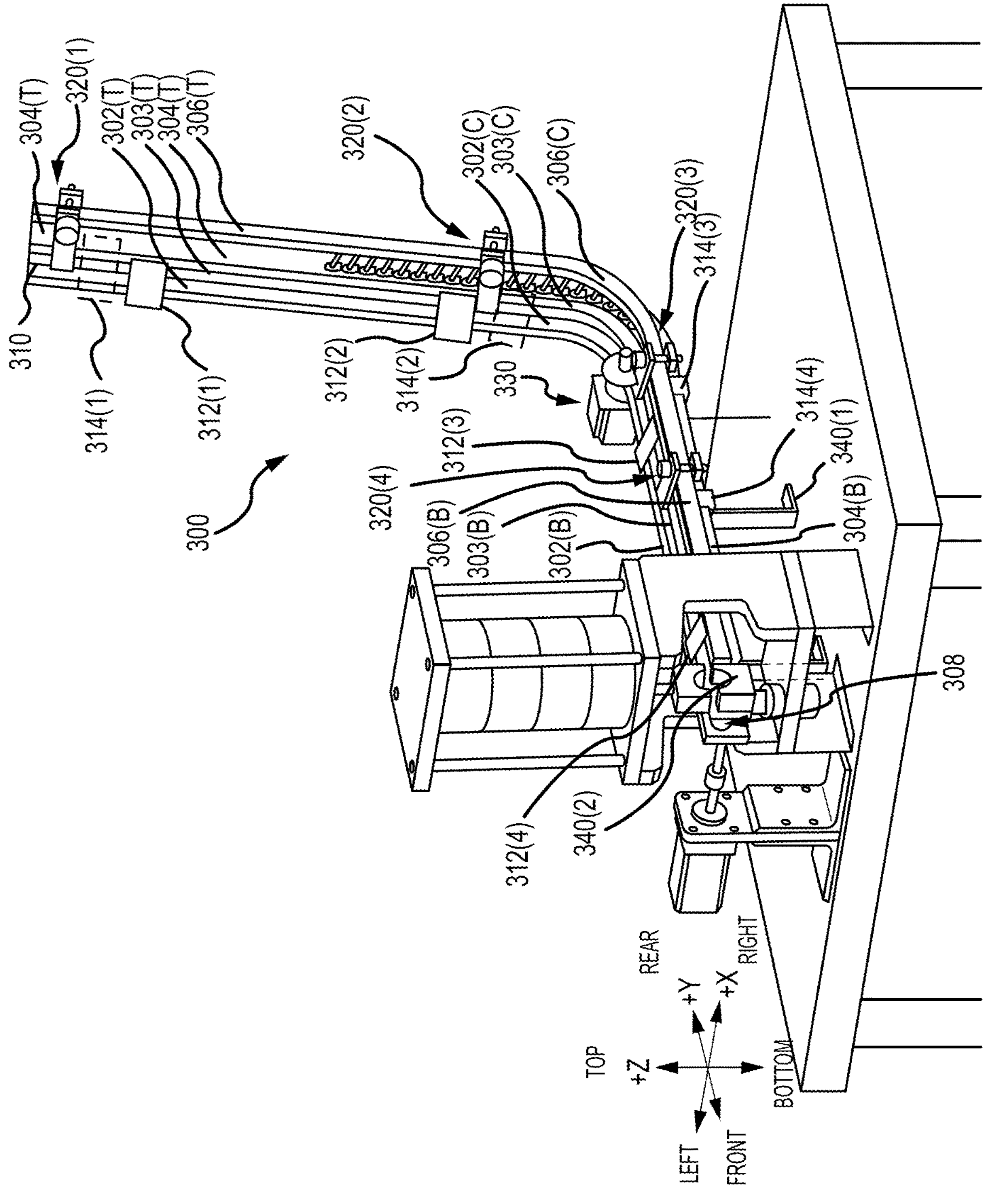
FIG. 3A is a front-right isometric view of a lug cartridge device, as configured for use with the lug press of FIG. 1A, and in accordance with at least one implementation of the present disclosure.
Figure 3C:
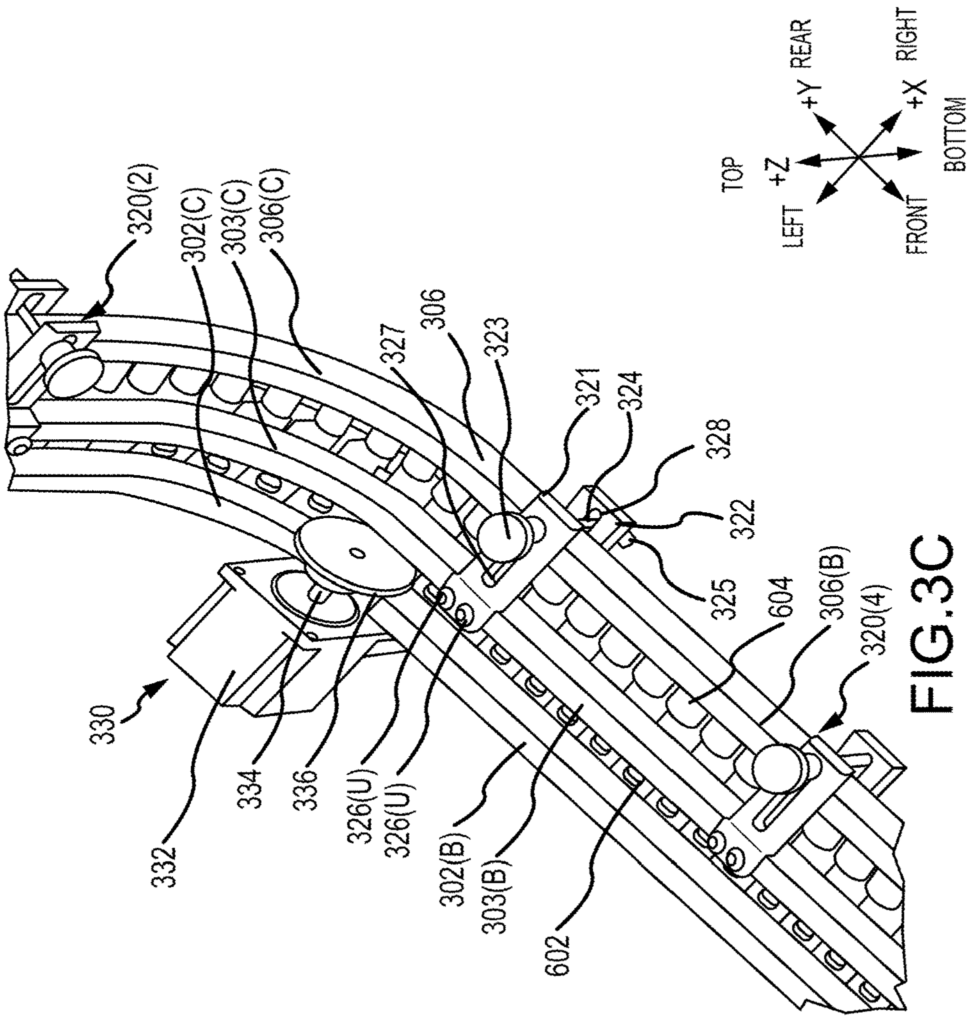
FIG. 3C is a close-up view of a portion of a middle section and a bottom section of the lug cartridge device of FIG. 3A, as configured for use with the lug press of FIG. 1A, and in accordance with at least one implementation of the present disclosure.
Figure 3B:
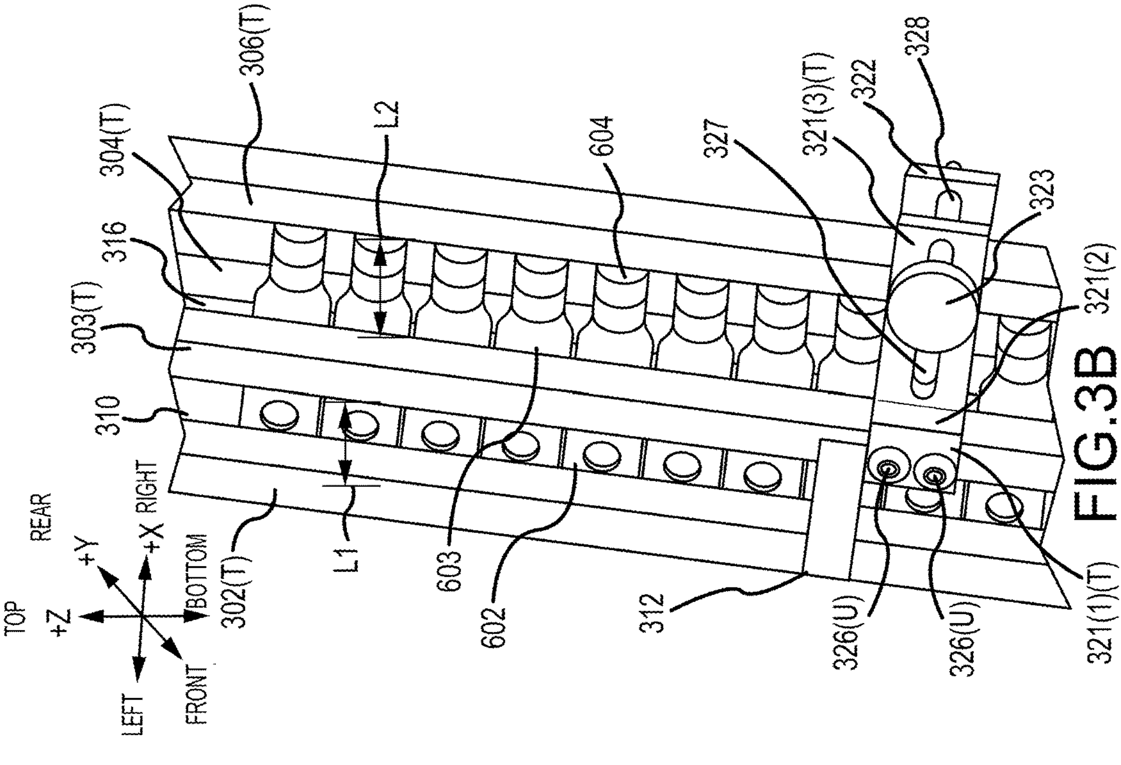
FIG. 3B is a close-up view of a portion of a top section of the lug cartridge device of FIG. 3A, as configured for use with the lug press of FIG. 1A, and in accordance with at least one implementation of the present disclosure.
Figure 3D:
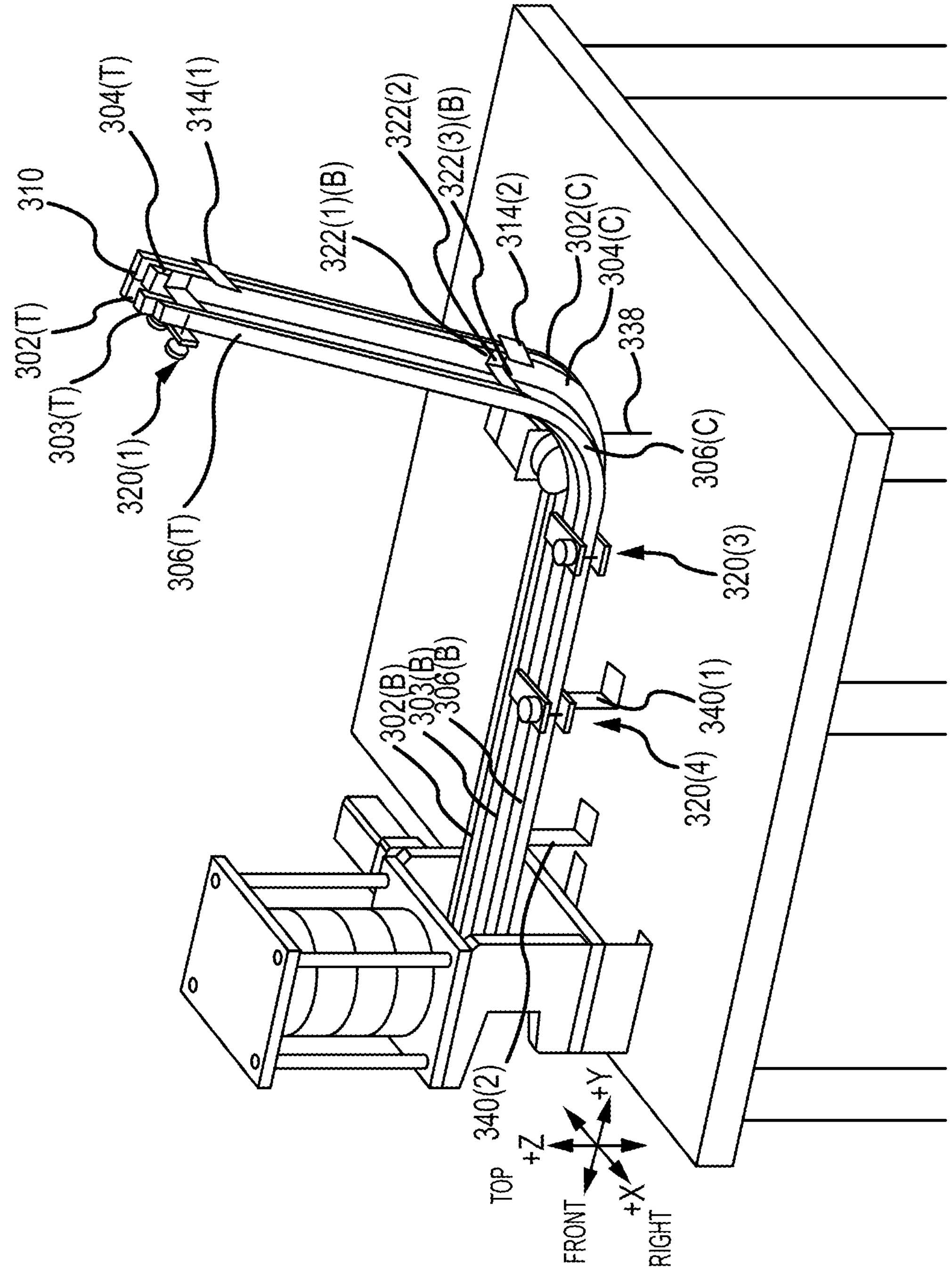
FIG. 3D is a rear-right isometric view of the lug cartridge device of FIG. 3A, as configured for use with the lug press of FIG. 1A, and in accordance with at least one implementation of the present disclosure.
Figure 3E:
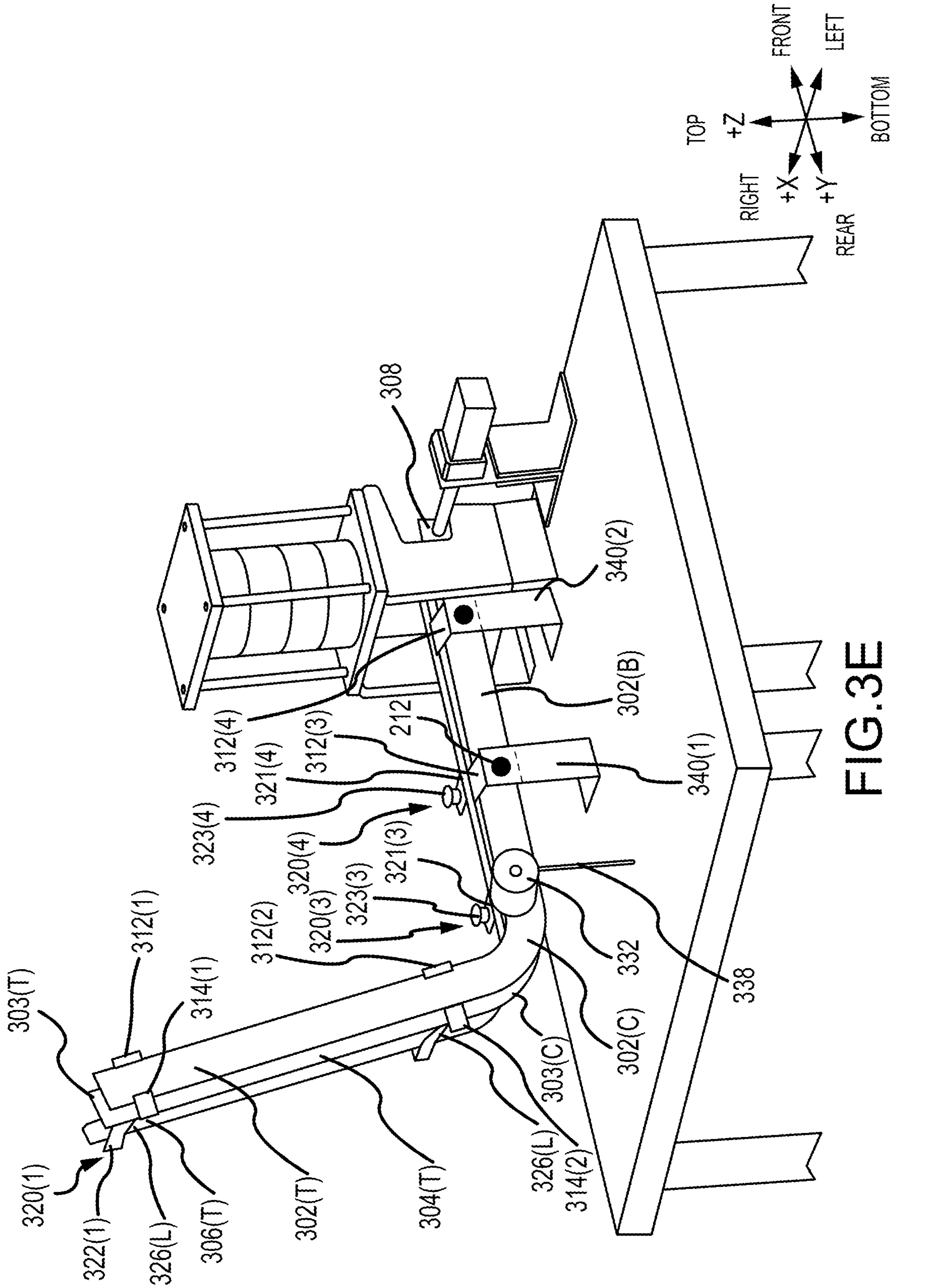
FIG. 3E is a rear-left isometric view of the lug cartridge device of FIG. 3A, as configured for use with the lug press of FIG. 1A, and in accordance with at least one implementation of the present disclosure.
Figure 3F:
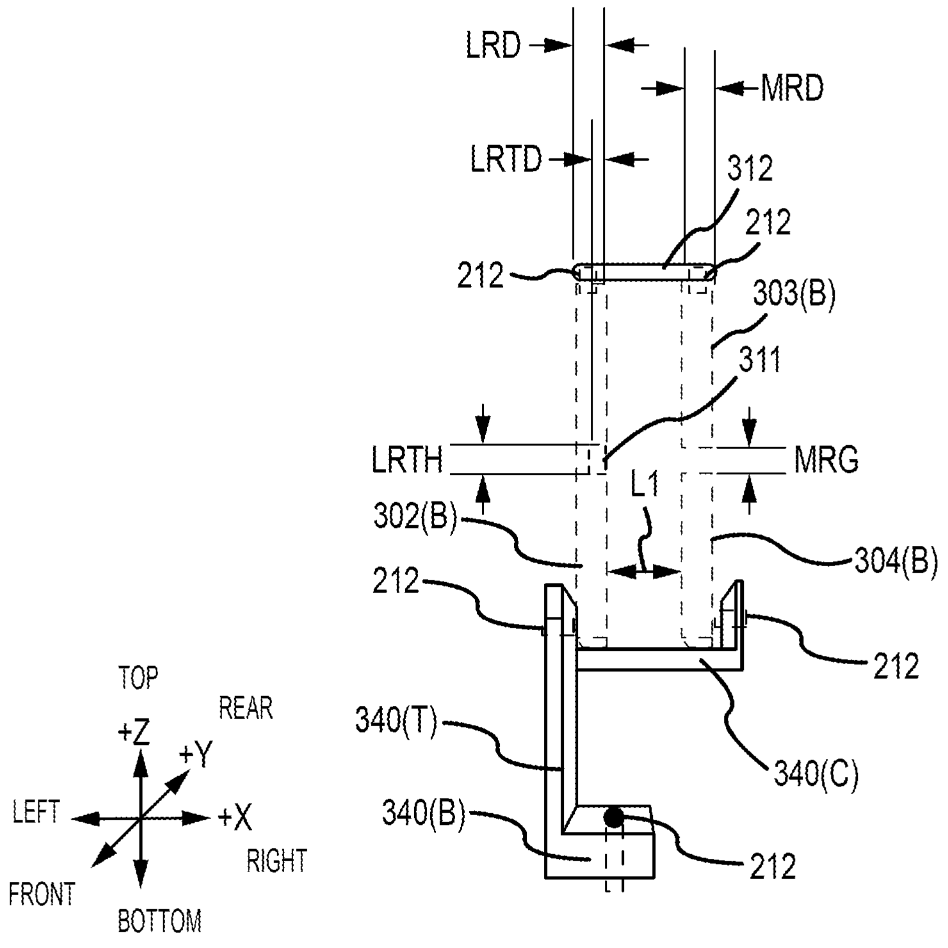
FIG. 3F is an isometric view of a lug cartridge support for the lug cartridge device of FIG. 3A, as configured for use with the lug press of FIG. 1A, and in accordance with at least one implementation of the present disclosure.
Figure 4A:
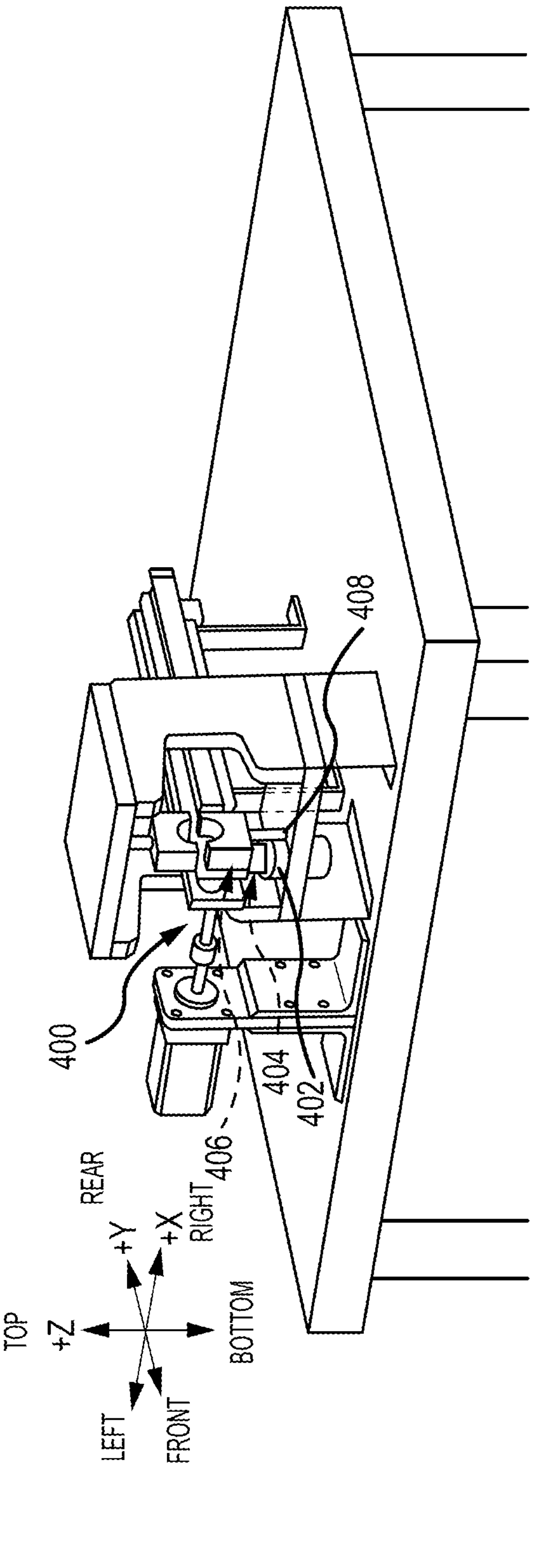
FIG. 4A is a front-right isometric view of a lug press separator device, as configured for use with the lug press of FIG. 1A, and in accordance with at least one implementation of the present disclosure.
Figure 4B:
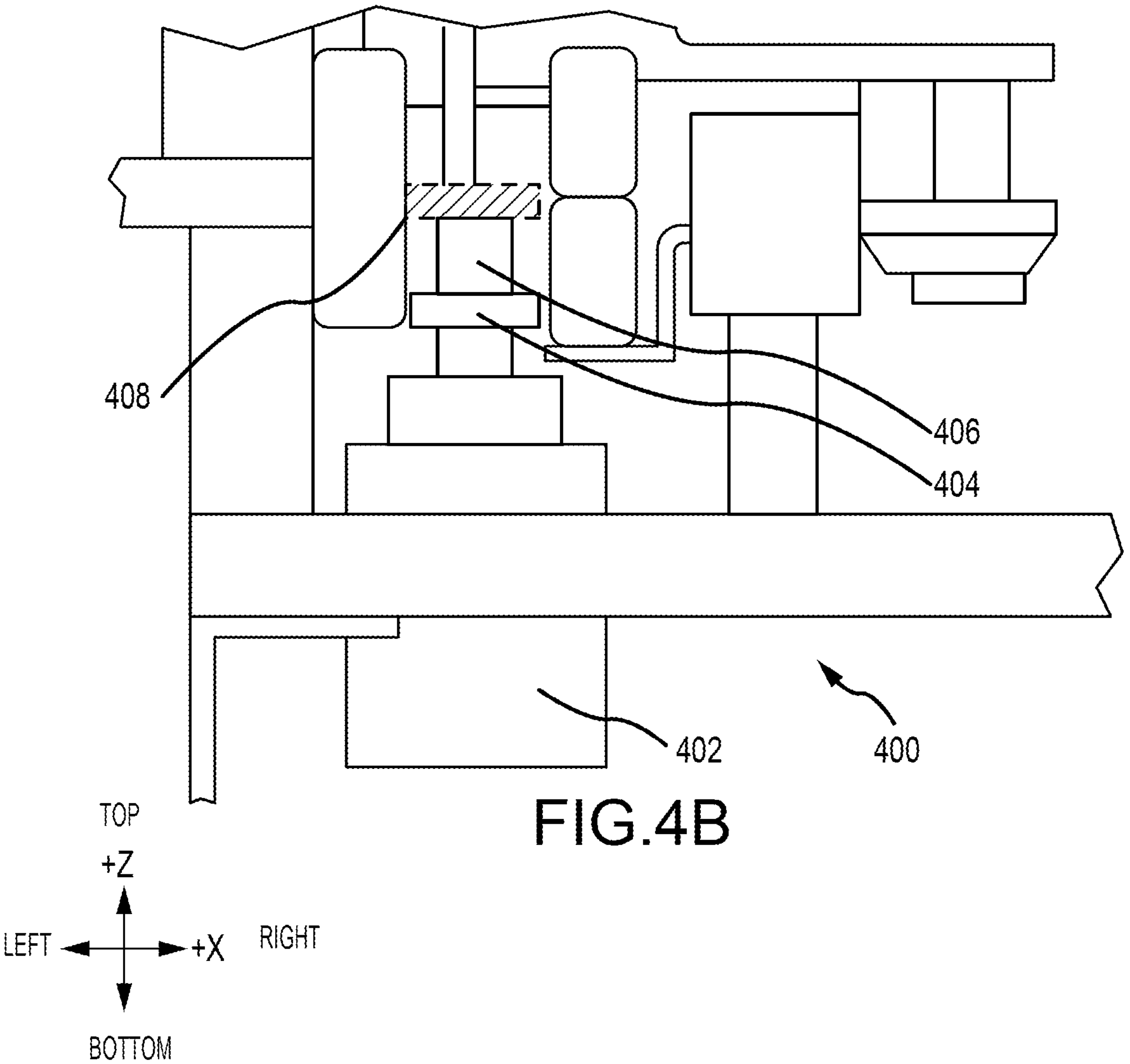
FIG. 4B is a front view of the lug press separator device of FIG. 4A, as configured for use with the lug press of FIG. 1A, and in accordance with at least one implementation of the present disclosure.
Figure 6A:
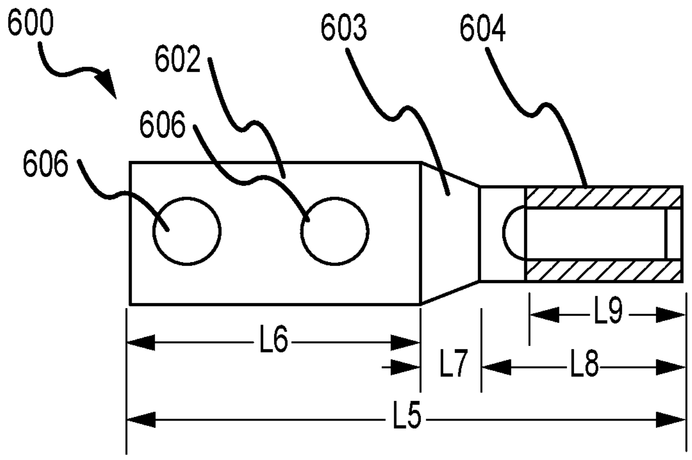
FIG. 6A is a top view of a lug.
Figure 6B:
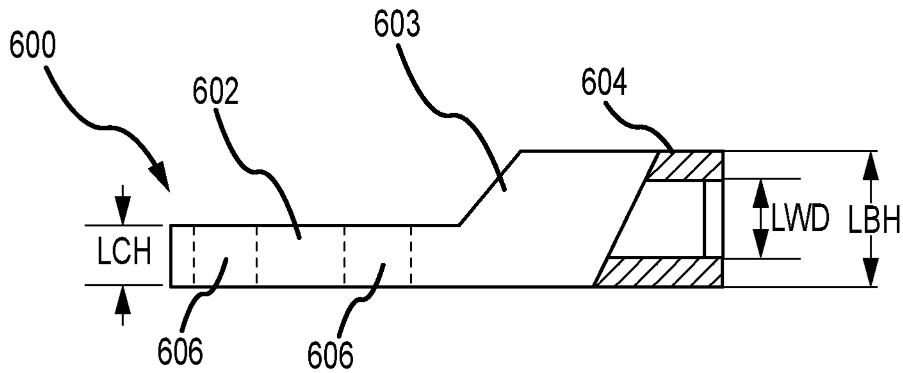
FIG. 6B is a side view of the lug of FIG. 6A.

As shown for at least one implementation in FIGS. 3B and 3F, the left rail 302 may have a left rail depth (LRD) of six-point-thirty-five millimeters (6.35 mm). The left rail 302 be formed in a "U" shape to include a left rail track 310 within which a portion of a lug connector portion 602 of lug 600 may be inserted. The left rail track 310 may be sized to accommodate insertion therein of a lug connector portion 602 having a lug connector thickness (LCH as shown in FIG. 6B) The left rail track 310 may have a left rail track depth (LRTD) of six-point-thirty-five millimeters (6.35 mm). Other depths for the left rail track 310 may be used for other implementations. As shown and for at least one implementation, the upper middle rail 303 and the lower middle rail 304 may have a middle rail depth (MRD) of six-point-thirty-five millimeters (6.35 mm). As shown in FIGS. 1F and 3H-I, the right rail 306 may have a right rail depth (RRD) of forty-five-point-one millimeters (45.1 mm). For at least one implementation, LRD=MRD=RRD.

As shown in FIG. 3A, a left rail bottom portion 302(B) may include a left rail opening 308 into which a placement positioning pad 216 may be extended and retracted. For at least one implementation, the left rail opening 308 may be configured in a circular form. For another implementation, the left rail opening 308 may be configured in a square, rectangle, triangle, oval, or other geometric shape.

A lug cartridge 300 may include one or more attachments which couple the rails to each other. For an implementation, a left rail to upper middle rail top plate couples the left rail 302 with the upper middle rail 303 at a fixed or variable connector separation distance L1 (as shown e.g., in FIGS. 3B and 3F). As shown in FIG. 3A, four top plates 312 may be utilized in an implementation, including a first-top plate 312(1), a second top plate 312(2), a third top plate 312(3), and a fourth top plate device 312(4). The top plates 312 may be attached to the tops portions of the left rail 302 and of the upper middle rail 303 using fasteners 212. When configured to be adjustable, the top plates 312 may include multiple members, having slots, therein. One of the members is secured to the top of the left rail 302 and the other member is secured to the top of the upper middle rail 303. The members may be secured to each other using a bolt inserted through the slots in each member and secured by tightening the bolt onto a nut. Being configured to slide relative to each other when the bolt is loosened, the connector separation distance L1 may be adjusted to accommodate lugs 600 having varying lengths of their respective lug connector portions 602.

As shown in FIG. 3D and for at least one implementation, the left rail top section 302(T) and left rail center section 302(C) may be respectively attached to the lower middle rail top section 304(T) and to the lower middle rail center section 304(C) by respective first bottom plate 314(1) and second bottom plate 314(2). For at least one implementation, the left rail 302 is also separated from the lower middle rail 304 by the connector separation distance L1 (as shown e.g., in FIG. 3E).

As shown in FIGS. 3A, 3D, 3E and 3F, the left rail 302 and the lower middle rail bottom section 304(B) may be supported above the top surface 104 of the work stand 102 by a leg press cartridge support 340. As shown in FIG. 3F, a lug press cartridge support 340 may include a lug cartridge support riser 340(T), a lug cartridge support base 340(B) and a lug cartridge support saddle 340(C). The lug cartridge support saddle 340(C) may be configured to accept both the left rail bottom section 302(B) and the lower middle rail bottom section 304(B). Fasteners 212 may secure the lug cartridge support saddle 340(C) to the left rail bottom section 302(B) and to the lower middle rail bottom section 304(B) For at least one implementation, the connector separation distance L1 separates the left rail bottom section 302(B) from the lower middle rail bottom section 304(B). Fasteners 212 may attach the lug cartridge support base 340(B) to the top surface 104 of the work stand 102. In FIGS. 3E and 3F and for purposes of drawing simplicity only, one fastener 212 is shown for attaching the cartridge support saddle 340(C) to the left rail bottom section 302(B) and one fastener 212 for attaching the cartridge support saddle 340(C) to the lower middle rail bottom section 304(B). In other implementations, any number of fasteners 212 may be used in a given implementation of the present disclosure.

For at least one implementation, the lug press cartridge support 340 may include a lug cartridge support saddle 340(C) having a varying width. The width may be varied by use of nuts and bolts securing a top saddle portion (not shown) with a bottom saddle portion (not shown), each having a slot therein to support the relative horizontal movement of one saddle portion with respect to the other saddle portion.

As shown in FIG. 3F, a middle rail gap "MRG" between the upper middle rail bottom section 303(B) and the lower middle rail bottom section 304(B) is formed when the left rail bottom section 302(B), upper middle rail bottom section 303(B) and lower middle rail bottom section 304(B) are fastened to the leg press cartridge support 340. The middle rail gap MRG has a gap height sufficient to accommodate insertion of a connector portion of a lug 600 therein. For at least one implementation, the middle rail gap MRG is substantially equal to a left rail track height LRTH (i.e., MRG≈LRTH).

Rail Adjustment Device

As further shown in FIGS. 3A-3E and 3G, the lug cartridge 300 may include one or more rail adjustment devices. A rail adjustment device may be used to adjust a distance between a first rail and a second rail. For example, a rail adjustment device 320 may be used to adjust a barrel separation distance L2 between the right rail 306 and the the upper middle rail 303. As shown for at least one implementation, a first rail adjustment device 320(1), a second rail adjustment device 320(2), a third rail adjustment device 320(3), and a fourth rail adjustment device 320(4) may be utilized. For any given implementation, two or more rail adjustment devices may be used. The rail adjustment device facilitates variable spacing of the right rail 306 from the upper middle rail 303 and the lower middle rail 304 by a barrel separation distance L2 (as shown in FIG. 3B), so that a given lug 600 with a given different barrel length L8 (as shown in FIGS. 6A and 6B) may be placed into a lug cartridge 300 and with the lug barrel portion 604 being between the right rail 306 and the upper middle rail 303 and the lower middle rail 304. The barrel separation distance L2 may vary by type of lug used including use of short barrel lugs, long barrel lugs, and the like. As shown in FIG. 3B and for at least one implementation, a portion of the barrel separation distance L2 used for a given implementation may account for a lug inner connector portion 603 for a given lug 600. Further as shown and for at least one implementation, a lug 600 may be oriented within a lug cartridge 300 such that a lug barrel portion 604 thereof may extend downwards (in a negative Z direction) and along the lower middle rail 304 (as shown) or upwards (in a positive Z direction) and along the upper middle rail 303 (not shown), with both orientations, the lug connector portion 602 extending towards the left rail 302 and through the middle rail gap MRG formed between the upper middle rail 303 and the lower middle rail 304 when such rails are secured to the lug press cartridge support 340 (as described above).

As shown in FIGS. 3B, 3C, 3G-I, 3G-T, 3G-S, 3H-I, 3H-T and 3H-S and for at least one implementation, a rail adjustment device 320 may include a top adjustment plate (TAP) 321 and a bottom adjustment plate (BAP) 322. The TAP 321 may include a first extension 321(1), a second extension 321(2), and a third extension 321(3). The first extension 321(1) may include a bottom 321(1)(B) and a top 321(1)(T), and have a third length L3. The second extension 321(2) may have a third H3. The third extension 321(3) may include a bottom face 321(3)(B) and a top face 321(3)(T) and have a fourth length L4. A TAP 321 may include one or more TAP mounting holes 321(4) (with two being shown) extending through the first extension 321(1). A top plate slot 327 may extend through the third extension 321(3). The top plate slot 327 may have any given length and width and may be configured to facilitate positioning of the right rail 306 at a given distance along at least a portion of the fourth length L4. Illustrative and non-limiting dimensions for the top adjustment plate 321 may be as shown in FIGS. 3G-I, 3G-T and 3G-S. For other implementations, other dimensions and configurations for the top adjustment plate 321 may be used.

For at least one implementation, third length L3 may vary based on a thickness of the upper middle rail 303 used. The tap height H3 may vary based on a given configuration of a lug 600, for example and not by limitation, based on a diameter of a lug barrel portion 604 for a given lug 600. The fourth length L4 may vary based with the length of a given barrel connector portion 602 and/or with the overall length of a given lug 600. It is to be appreciated that the top adjustment plate 321, as shown in FIGS. 3G-T, 3G-S and 3G-I, has been rotated one-hundred and eighty degrees (180°) about the X-axis. In comparison and as shown in FIG. 3A, the top plate 321 has not been so rotated.

As shown in FIGS. 3H-I, 3H-T and 3H-S and for at least one implementation, the bottom adjustment plate (BAP) 322 may include a first extension 322(1), a BAP second extension 322(2), and a third extension 322(3). The first extension 322(1) may include a bottom 322(1)(B) and a top 322(1)(T), and have the third length L3. The second extension 321(2) may have a fourth H4. The third extension 322(3) may include a bottom face 321(3)(B) and a top face 321(3)(T) and have the fourth length L4. A BAP 322 may include one or more BAP mounting holes 322(4) (with two being shown) extending through the first extension 322(1). A bottom plate slot 328 may extend through the third extension 322(3). The bottom plate slot 328 may have any given length and may be configured to facilitate positioning of the right rail 306 at a given distance along at least a portion of the fourth length L4. Illustrative and non-limiting dimensions for the BAP 322 may be as shown in FIGS. 3H-I, 3H-T and 3H-S. For other implementations, other dimensions and configurations may be used.

For at least one implementation, the TAP second extension 321(2) and the BAP second extension 322(2) may have equivalent or different dimensions. When equivalent dimensions are utilized, a lug barrel portion 604 may extend equally, in part and in parallel along the upper middle rail 303 and the lower middle rail 304. When non-equivalent dimensions are utilized, a lug barrel portion 604 may be extend substantially in parallel along one of the lower middle rail 303 (as shown) or the upper middle rail 303 (when inverted by rotation about the X-axis and not shown).

For at least one implementation, the top plate slot 327 and the bottom plate slot 328 are parallel and have substantially the same lengths and widths.

As further shown in FIGS. 3B and 3C and for at least one implementation, a rail adjustment device 320 may include a tightening knob 323, an adjustment bolt 324 and an adjustment nut 325. Upper middle rail fasteners 326(U) may fasten the TAP 321 to the upper middle rail 303. Lower middle rail fasteners 326(L) (as shown in FIG. 3E) may fasten the BAP 322 to the lower middle rail 304.

For at least one mode of operation, the rail adjustment device 320 may be configured to support lugs 600 having any desired length that are less than the length of the top plate slot 327 and the bottom plate slot 328. For example, upon loosening of the tightening knob 323 at each of the rail adjustment devices 320 used with a given implementation, a distance of the right rail 306 from one or both of the upper middle rail 303 and the lower middle rail 304 may be increased of decreased. The distance may be adjusted based on a length of a given lug lug barrel portion 604. For at least one implementation, the right rail 306 may be positioned to provide minimal pressure onto a lug 600 inserted into the lug cartridge 300 such that the lug 600 may slide along the length of rails (as represented by movement in the negative Y (−Y) axis direction) while experiencing minimal rotation (e.g., a rotation of less than five degrees (5°) of rotation) relative to the Z axis, while not shifting laterally (along the X axis) by more than ten millimeters (10 mm).

Lug Drive 330

As further shown in FIGS. 1A, 1E and 3A-3E, a modified lug press 100 may include a lug drive 330 configured to sequentially push lugs 600, located in a lug cartridge 300, towards a lug press 500. A lug drive 330 may be any device configured to facilitate controlled movement of lugs 600, positioned within a lug cartridge 300, towards the lug press 500. For at least one implementation, a lug drive 330 may include a lug drive motor 332, a lug drive motor shaft 334, a lug drive wheel 336, and a lug drive support 338. The lug drive motor 332 may be a stepper motor, a DC motor or otherwise. For at least one implementation, a DC motor manufactured by Oriental motor company of Japan may be utilized. The lug drive motor shaft 334 is coupled to the lug drive wheel 336. The lug drive motor 332 is coupled to the lug drive support 338, which may be fastened to the top surface 104, to the left rail 303, to a lug press cartridge support 340, to a lug press 500, or otherwise. For at least one implementation, the lug drive wheel 336 is configured to contact a top surface of a lug connector portion 602 of at least one lug 600 inserted into a lug cartridge 300. When the lug drive motor 332 is activated, the lug drive wheel 336 pushes the so contacted lug 600 along the lug cartridge 300 and towards the lug press 500 such that a next to be crimped lug 600 is then positioned within the lug press die 514. For at least one implementation, a lug drive wheel 336 may include a belt drive or other configuration such that any number of lugs 600 ranging between five (5) to fifty (50) lugs 600 may be inserted into a given lug cartridge 300 may pushed, by the lug drive 330, along the rails and towards the lug press 500.

In another implementation, multiple lug drives 330 may be used and positioned along a length of a bottom portion of a lug cartridge 300 to facilitate progression of the lugs 600 along the rails and towards the lug press 500. It is to be appreciated that for those lugs 600 positioned, at a given time, in an upper section or center section of a lug cartridge, gravitational forces may be relied upon for facilitating progression of lugs 600 along the rails and towards the lug press 500.

Lug Separator 400

As shown in FIGS. 1A, 1F, 4A and 4B, a modified lug press 100 may include a lug separator 400. A lug separator 400 may be provided to separate a first lug 600 within a lug cartridge 300 from a second lug 608 within the lug cartridge 300 such that a force in the −Y direction is not applied on the first lug 600, by the second lug 608, while the first lug 600 is positioned within a lug press die 514 and awaiting activation of the lug press 500 and the crimping of the first lug 600 onto a wire (not shown) inserted into the first lug 600.

For at least one implementation, a lug separator 400 may include a lug separator actuator 402, a lug separator guide 404, a lug separator plate 406, and a lug sensor 408. The lug separator actuator 402 may be a stepper motor configured to periodically raise and lower the lug separator plate 406 during operation of the modified lug press 100. The lug separator guide 404 may provide a vertical adjustment, along the Z axis, of the lug separator plate 406 based on a configuration of a given lug 600. The lug separator plate 406 may be a metal or other material formed plate that, upon activation of the lug separator actuator 402, is retracted (in the −Z direction) until a next lug 600 in the lug cartridge 300 is positioned in the lug press die 514, as detected by the lug sensor 408. For at least one implementation, the lug sensor may be an optical sensor configured to detect when a lug 600 is seated within a lug press die 514.

For at least one implementation, the lug separator 400 may be attached to the lug press 500 using fasteners (not shown), and attachment plates (not shown). For another implementation, the lug separator 400 may be attached to the placement motor stand 214, the lug press cartridge support 340, or otherwise.

Lug Press 500

Figure 5A:
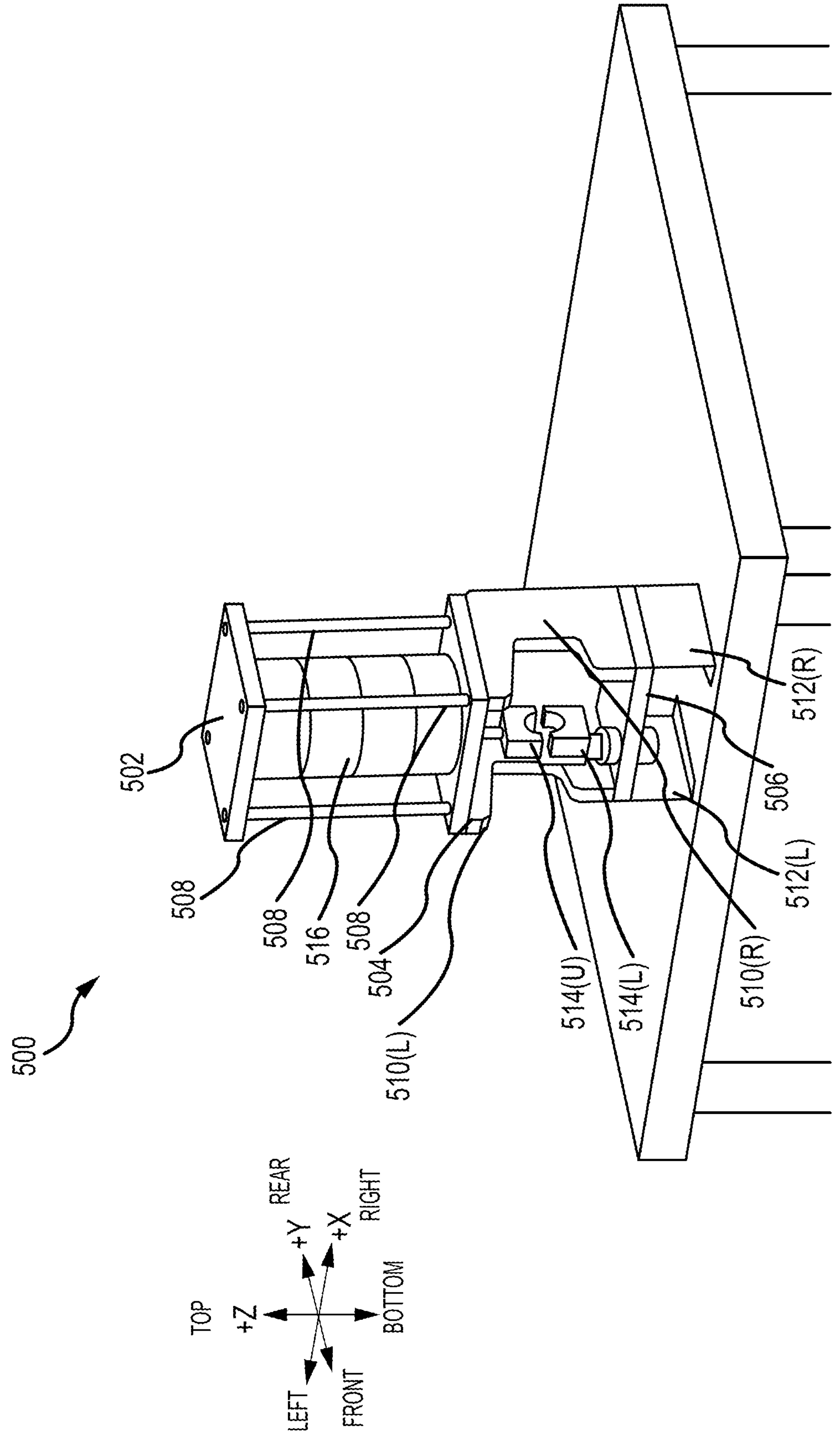
PRIOR ART FIG. 5A
FIG. 5A is a front-right isometric view of a prior art Burndy Lug Press, as configured for use with the lug press of FIG. 1A, and in accordance with at least one implementation of the present disclosure.
Figure 5B:
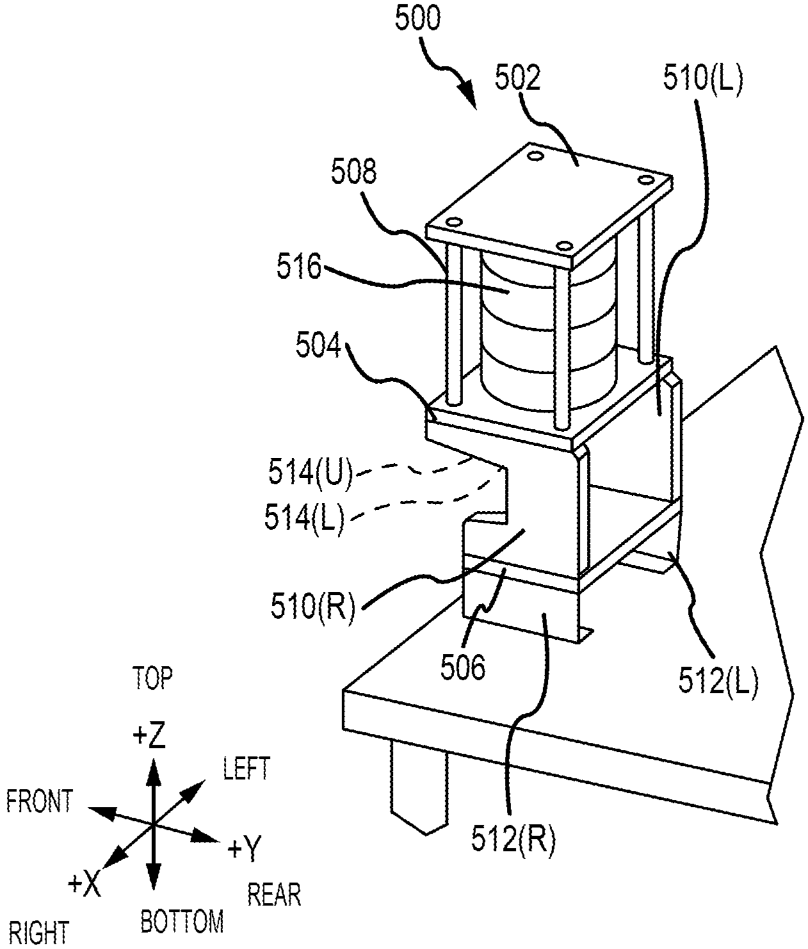
PRIOR ART FIG.5B
FIG. 5B is a rear-right isometric view of the prior art Burndy Lug Press of FIG. 5A, as configured for use with the lug press of FIG. 1A, and in accordance with at least one implementation of the present disclosure.

As shown in FIGS. 1A, 5A and 5B, a modified lug press 100 may include a lug press 500. As discussed above, any known or later arising lug press 500 may be utilized. For purposes of illustration and discussion only, various components of a Burndy Lug Press are shown. As shown the lug press 500 may include a lug press top plate 502, a lug press middle plate 504, a lug press bottom plate 506, one or more lug press upper vertical support members 508, one or more lug press middle vertical support members 510, one or more lug press lower vertical support members 512, a lug press die 514 having an upper lug press die 514(U) and a lower lug press die 514(L), and a lug press drive 516. It is to be appreciated that the lug press die 514 used to crimp a given lug 600 onto a given wire (not shown) may vary with the lug, the wire, the type of crimping to be applied, and otherwise. It is also to be appreciated that the crimping force applied by a lug press drive 516 may vary based on the lug, the wire, the type of crimping to be applied, the die used, the intended use of the combined lug and wire, and otherwise. The controller 700 may be configured to control activation of the lug press drive 516 such that a given crimping of a given lug onto a given wire occurs.

Lug 600

As shown in FIG. 6A and as described above, a lug 600 may include a lug connector portion 602, a lug inner connector portion 603 and a lug barrel portion 604, having a lug barrel opening length L9. The lug 600 may have an overall length L5, a lug first connector length L6, a lug inner connector length L7, and a lug barrel length L8. For at least one implementation, the lug connector length L6 is equal to the connector separation distance L1 plus the left rail track depth LRTD, that is: L6=L1+LRTD. For at least one implementation, the the lug connector length L6 plus the lug inner connector length L7 is substantially equal to the TAP first extension length L3 plus the TAP third extension length L4 (i.e., L6+L7≈L3+L4). For at least one implementation, the lug inner connector length L7 is substantially equal to the middle rail depth RRD plus three nine-point-nineteen millimeters (9.19 mm) (i.e., L7≈RRD+9.19 mm). For at least one implementation, the lug barrel length L8 is substantially equal to the barrel separation distance L2 plus seventeen-point-four millimeters (17.4 mm) (i.e., L8≈L2+17.4 mm) For at least one implementation, the lug barrel opening length L9 may be between eleven-point-twenty-five millimeters (11.25 mm) and eleven-point-four millimeters (11.4 mm).

As shown in FIG. 6B, the lug connector portion 602 may have a lug connector thickness LCH that is between between ten to thirty millimeters (10-30 mm). Other thicknesses of LCH may be used for other implementations with corresponding changes in one or more of the left rail track height LRTH and the middle rail gap MRG. The lug barrel portion 604 may have a lug barrel height LBH that, for at least one implementation, is between zero-point-zero-one millimeters (0.01 mm) and zero-point-zero-two millimeters (0.02 mm). The lug inner connector portion 603 may have a constant thickness of either the LCH or the LBH (not shown in FIG. 6B), a thickness that varies between the LCH and the LBH (as shown), or other configuration. The lug barrel portion 604 includes an opening having a lug wire diameter (LWD), for at least one implementation, that is between three-point-zero-five millimeters (3.05 mm) and three-point-one-five millimeters (3.15 mm). Other LWDs may be used for other implementations. For at least one implementation, an LWD may correspond to a given wire gauge, such as a 10-gauge wire, a 14-gauge wire, or otherwise.

For at least one implementation, a lug 600 may include one or more fastener openings 606. The fastener opening 606 may have any given size (diameter) or configuration.

Controller 700

Figure 7:
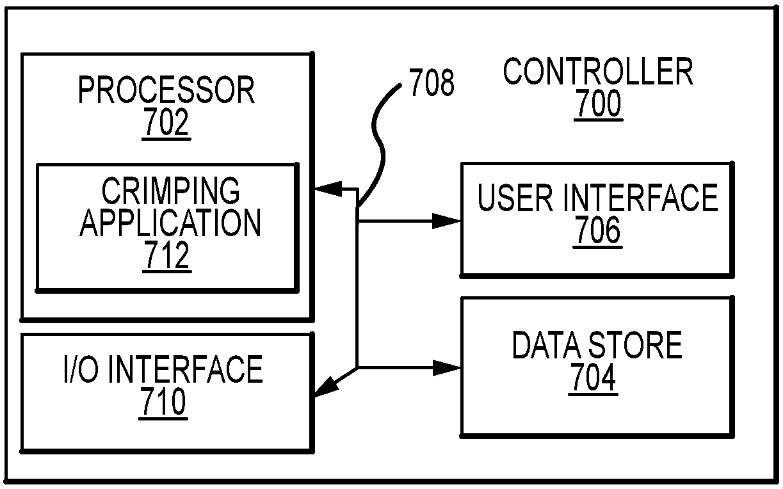
FIG. 7 is a schematic illustration of a controller, as configured for use with the lug press of FIGS. 1A-5B, and in accordance with at least one implementation of the present disclosure.

As shown in FIG. 1A and FIG. 7, the modified lug press 100 may include a controller 700. The controller 700 may be coupled to one or more of the lug placement device 200, the lug drive 330, the lug separator 400 and the lug press 500. For at least one implementation, the controller 700 may include a processor 702, a data store 704, a user interface 706, a bus 708, an input/output (I/O) interface 710, power supply (not shown), security component (not shown), and the like.

Processor 702: For at least one implementation, the processor 702 may be configured to execute non-transient computer instructions which instantiate one or more of an "engine" (as define below), an "application" (as defined below), or the like which facilitate operations by which the modified lug press 100 may sequentially crimp lugs 600 onto wires upon the insertion of a given wire into a given lug 600, when the given lug 600 is properly situated within a lug press die 514, and as facilitated by automatic, semi-automatic and/or manual activation of the lug press 500. As used herein, "processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Application" herein refers to a set of computer instructions that configure one or more processors perform one or more tasks that are other than tasks commonly associated with the operation of the processor itself (e.g., a "system software," an example being an operating system software), or the providing one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Instruction" (which is also referred to herein as a "computer instruction") herein refers to a non-transient processor executable instruction, associated data structure, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

Crimping Application 712: For at least one implementation, the processor 702 may be configured to implement a "crimping application" 712. For at least one implementation, the crimping application 712 may be facilitate the automated, semi-automated and/or manual crimping of wires into lugs 600 using an implementation of a modified lug press 100 by instructing system devices and/or an operator of one or modified lug press 100 components to perform the operations depicted in FIG. 8. For at least one mode of operation, the crimping application 712 may include one or more of the following operations.

Operation 800: Start lug crimping.

Operation 802: For at least one implementation, the operations may include configuring the rails and system for a given lug type. For at least one implementation, configuring of the rails may include adjustments to one or more of the connector separation distance L1, the barrel separation distance L2, and the middle rail gap MRG. For at least one implementation, configuring the system may include adjustments being made to one or more of the lug placement device 200, such as a length of the placement motor positioning shaft, the lug drive 330, such as using a different type of lug drive wheel 336, to the lug press 500, such as use of a different type of lug press die 514 or the crimping force utilized, or the like.

Operation 804: For at least one implementation, the operations may include the lug separator actuator 402 extending the lug separator plate 406 and thereby separating the area in which a second lug 608 will be positioned within a lug press die 514 from a lug, to be loaded into the lug cartridge 300.

Operation 806: For at least one implementation, the operations may included loading lugs into the lug cartridge 300. The loading of the lugs may occur manually, semi-automatically or automatically, such as by use of one or more hoppers (not shown) positioned relative to the top sections of lug cartridge rails, where the hopper contains multiple lugs and, upon opening of a feed door, the lugs may be pushed onto the rails by force, gravity, and/or otherwise.

Operation 808: For at least one implementation, the operations may include the lug separator 400 retracting the lug separator plate 406. Such operation may occur, for example, upon a detection, by the lug sensor 408, that a lug is no longer present within the lug press die 514 (such may arise when crimping of a wire onto a given lug has been completed and the as crimped lug and wire have been removed from the modified lug press 100).

Operation 810: For at least one implementation, the operations may include the lug drive 330 being activated and thereby pushing a lug then in contact with the lug drive wheel 336 towards the lug press 500, until the second lug 608 is now seated within the lug press die 514.

Operation 812: For at least one implementation, the operations may include the lug sensor 408 awaiting detection that a second lug 608 is so seated within the lug press die 514. If no, the process may include performing operation 810 until a lug is so detected within the lug press die 514, as represented by Operation 814.

Operation 816: For at least one implementation, the operations may include the lug separator actuator 402 extending the lug separator plate 406 and thereby separating the second lug 608 (now present within the lug press die 514) from a next lug 600 positioned in the lug cartridge 300. The controller 700 may also instruct the lug drive 330 to stop the lug drive motor 332.

Operation 818: For at least one implementation, the operations may include activating the placement motor 202 so that the placement positioning pad 216 is extended to make contact with at least a left edge of the lug connector portion 602 and thereby apply an opposing force, by the placement positioning pad 216, on the second lug 608 when a wire is inserted into a lug barrel portion 604 of the lug 600.

Operation 820: For at least one implementation, the operations may include inserting a wire into the lug. The wire may be inserted manually, semi-automatically, or automatically into the lug.

Operation 822: For at least one implementation, the operations may include crimping the lug onto the wire by activing the lug press, which upon activation applies a downward pressure on the lug barrel portion 604 and thereby crimps the lug onto the wire.

Operation 824: For at least one implementation, the operations may include deactivating the placement motor 202 so that the placement positioning pad 216 is retracted away from the left edge of the lug connector portion 602.

Operation 826: For at least one implementation, the operations may include determining whether another lug is to be crimped to another wire. If "no," the operations end, as per Operation 830. If "yes", the operations proceed with Operation 828.

Operation 828: For at least one implementation, the operations may include determining whether a next lug to be crimped to a next wire has the same configuration and/or dimensions as the last crimped lug. If "yes," the operations may continue with Operation 808. If "no," the operations may continue with Operation 802.

Figure 8:
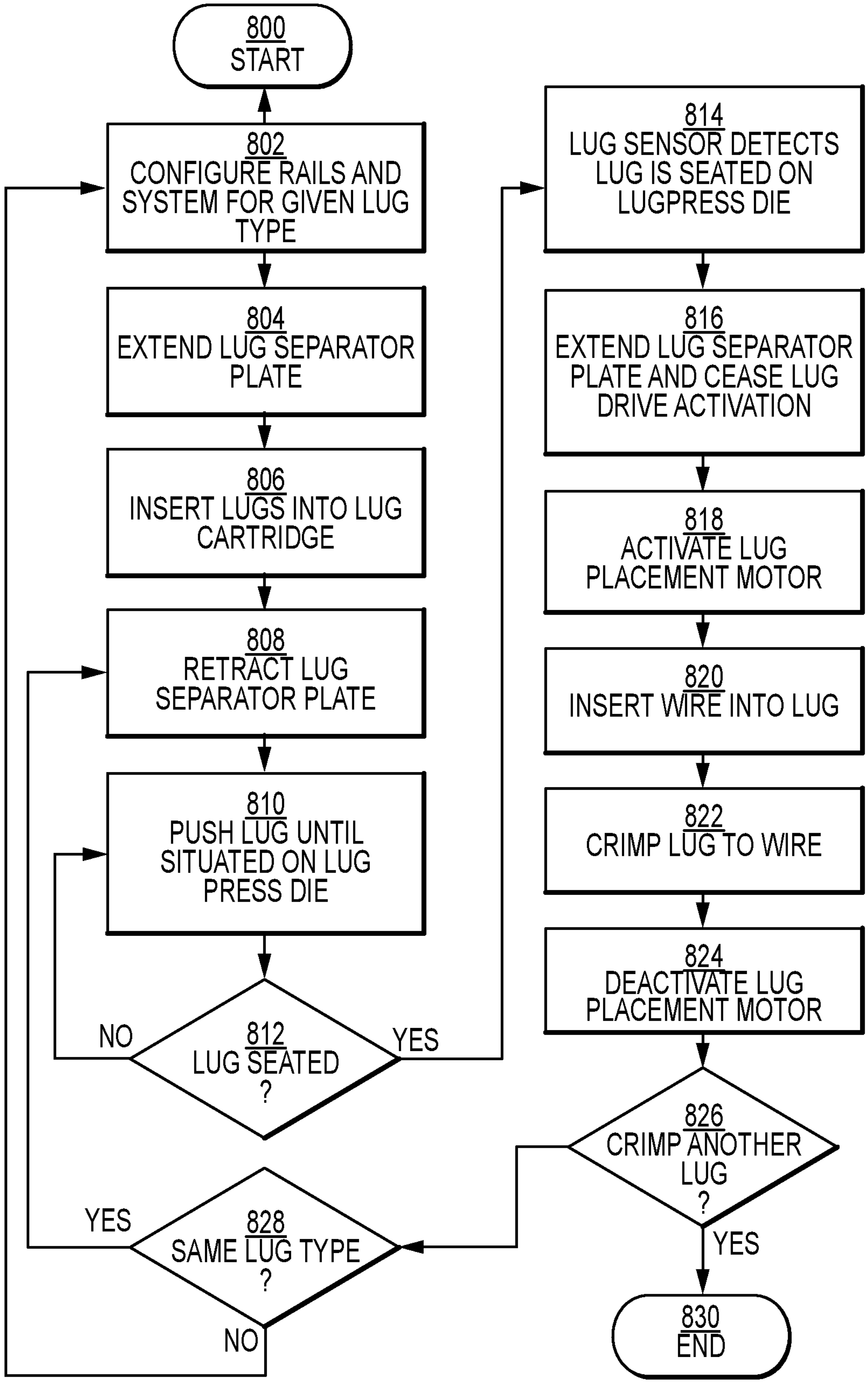
FIG. 8 illustrates a process for crimping a lug onto a wire using a modified lug press system, and in accordance with at least one implementation of the present disclosure.

It is to be appreciated that the operations depicted in FIG. 8 are for illustrative purposes and one or more of the operations shown and described above and/or additional and/or alternative operations may be utilized in accordance with a given implementation of the present disclosure.

Data Store 704: Referring again to FIG. 7, for at least one implementation, the data store 704 may include any device or combinations of devices configured to store data (as described below) on a temporary, permanent, transient, non-transient, or other basis. A data store may store data in any form, such as electrically, magnetically, physically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient data, computer instructions, or other the like may be suitably stored in a data store. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient data and content.

"Data" (which is also referred to herein as a "computer data") herein refers to any representation of facts, information or concepts in a form suitable for processing, storage or the like by one or more electronic device processors, data stores or the like. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet may again have a non-transient state. For example, and not by limitation, data may take any form including as one or more applications, content, or otherwise.

User Interface 706: For at least one implementation, a user interface 706 may be provided and configured to present data to a human, using a suitable presentation device, in a humanly perceptible format. When presented to a human, the data becomes "information." Non-limiting examples of content include gaming images and graphics such as those related to lugs and configurations of the system for a given lug, or otherwise. Content may include, for example and not by limitation, one or more sounds, images, video, graphics, or otherwise. The content may be presented to a given user using any user device and any user interface. Content may be stored, processed, communicated, or otherwise utilized.

For at least one implementation, a user interface 706 may be provided with and/or coupled to a device, configured to support a receiving and/or presenting of additional inputs and outputs to and from one or more users. A user interface 706 may be configured to support the receiving and presenting of the information to users. For at least one implementation, the user interface 707 may include one or more of an Audio I/O interface, a Visual I/O interface, and/or other interfaces.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface generally includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize and capture comments spoken by a user and intended as audible signals for sharing with other users, inputting commands, or otherwise.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface generally includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Bus 708: For at least one implementation, the bus 708 may be any known and/or later arising technologies which facilitate the transfer of data within and/or between devices. Non-limiting examples include Universal Serial Bus (USB), PCI-Express, Compute Express Link (CXL), IEEE-488 bus, High Performance Parallel Interface (HIPPI), and the like.

I/O Interface 710: For at least one implementation, the Input/Output (I/O) interface 710 may be any device which couples the controller 700 to one or more of the lug placement device 200, the lug drive 330, the lug separator 400, the lug press 500, to the Cloud (not shown and as described below), to one or more servers (not shown and as described below), to other devices (not shown and as described below), or otherwise.

"Couples and Coupling" herein refer to establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), VOIP, Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Cloud" herein refers to cloud computing, cloud storage, cloud communications, and/or other technology resources which a given user does not actively manage or provide. A usage of a Cloud resource may be private (limited to various users and/or uses), public (available for many users and/or uses), hybrid, dedicated, non-dedicated, or otherwise. It is to be appreciated that implementations of the present disclosure may use Cloud resources to provide for processing, storage and other functions related to facilitating bet settlement. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Device" and "electronic device" herein refer to any known or later arising electrical device configured to, singularly and/or in combination, communicate, manipulate, output for presentation as information to a human, process, store, or otherwise utilize data. Non-limiting examples of devices include user devices and servers.

"User Device" herein refers to a device configured for use by a human being to one or more of communicate, present, process, and store data. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"Power Supply/Power" herein refers to any known or later arising technologies which facilitate the use of electrical energy by a device. Non-limiting examples of such technologies include batteries, power converters, inductive charging components, line-power components, solar power components, and otherwise.

"Security Component/Security" herein refers to any known or later arising processor, computer instruction, and/or combination thereof configured to secure data as communicated, processed, stored, or otherwise manipulated. Non-limiting examples of security components include those implement encryption standards, such as an Advanced Encryption Standard (AES), transport security standards, such as Transport Layer Security (TLS) or Secure Sockets Layer (SSL).

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as described in the following claims.

What is claimed is:

1. A modified lug press comprising:

a lug press comprising:

a lug press die having a front side and a rear side arranged at opposite sides of the lug press die in a front-rear direction and a left side and a right side arranged at opposite sides of the lug press die in a left-right direction;

a lug press drive; and a lug cartridge, comprising an upper middle rail and a lower middle rail extending in the front-rear direction;

wherein the lug press is configured to crimp a given lug, positioned in the lug press die, to a given wire;

wherein the given lug includes:

a lug connector portion; and a lug barrel portion;

wherein the lug cartridge is configured to hold the given lug and at least one additional lug, and successively align the given lug and the at least one additional lug for insertion onto the lug press die;

wherein the upper middle rail and the lower middle rail are arranged on opposite sides of the given lug while the given lug is located in the lug cartridge to inhibit vertical movement of the given lug while the given lug is situated in the lug press die;

wherein the upper middle rail and the lower middle rail each include a bottom section arranged along the left side of the lug press die, and a center section and a top section arranged behind the rear side of the lug press die:

wherein the bottom sections of the upper middle rail and the lower middle rail each include a front side, a left side, a right side, and a bottom side;

wherein during lug to wire crimping operations:

the front sides of the bottom sections of the upper middle rail and the lower middle rail are substantially planar with the front side of the lug press die, the right sides of the bottom sections of the upper middle rail and the lower middle rail extend, from the front sides of the bottom sections of the upper middle rail and the lower middle rail, along the left side of the lug press die, and to the center sections of the upper middle rail and the lower middle rail respectively, and the center sections of the upper middle rail and the lower middle rail extend parallel to the left side of the lug press die and behind the rear side of the lug press die in the front-rear direction, rearwards from the bottom sections of the upper middle rail and the lower middle rail towards the top sections of the upper middle rail and the lower middle rail respectively; and wherein, upon insertion of the given lug, as aligned by the lug cartridge, onto the lug press die and activation of the lug press drive, the lug press is configured to crimp the given lug to the given wire.

2. The modified lug press of claim 1, wherein the lug cartridge further comprises:

a left rail; and a right rail;

wherein the left rail is separated from the upper middle rail and the lower middle rail by a connector separation distance ("L1"); and wherein the upper middle rail and the lower middle rail are separated from the right rail by a barrel separation distance ("L2").

3. The modified lug press of claim 2, wherein the lug connector portion has a lug connector length ("L6");

wherein L1≈L6;

wherein the lug barrel portion has a lug barrel length ("L8"); and wherein L2≈L8.

4. The modified lug press of claim 3, wherein at least one of L6 and L8 may vary from a first lug type to a second lug type; and wherein at least one of L1 and L2 are adjustable based on a lug type for the given lug.

5. The modified lug press of claim 2,
wherein the given lug further comprises a lug inner connector portion, having a lug inner connector length ("L7");
wherein the lug inner connector portion couples the lug connector portion to the lug barrel portion;
wherein the lug barrel portion has a lug barrel length ("L8");
wherein L2>L8; and
wherein L2≈L7+L8.
6. A modified lug press comprising:
a lug press comprising:
a lug press die; and
a lug press drive;
wherein the lug press, when activated, crimps a given lug, positioned in the lug press die, to a given wire;
wherein the given lug includes:
a lug connector portion; and
a lug barrel portion; and
a lug cartridge holding the given lug and at least one additional lug, and successively aligning the given lug and the at least one additional lug for insertion onto the lug press die; and
wherein the lug cartridge comprises:
a left rail comprising;
a left rail track having a left rail track height ("LRTH") selected to accept an end of the lug connector portion having a lug connector thickness ("LCH");
at least one middle rail comprising;
an upper middle rail; and
a lower middle rail;
wherein the upper middle rail and the lower middle rail are commonly aligned in an upper and lower relationship with respect to each other; and
wherein a middle rail gap ("MRG") separates the upper middle rail from the lower middle rail; and
a right rail;
wherein the left rail is separated from the at least one middle rail by a connector separation distance ("L1"); and
wherein the at least one middle rail is separated from the right rail by a barrel separation distance ("L2"); and
wherein, upon insertion of the given lug, as aligned by the lug cartridge, onto the lug press die and activation of the lug press drive, the lug press crimps the given lug to the given wire.
7. The modified lug press of claim 6,
wherein MRG>LCH.
8. The modified lug press of claim 6,
wherein the lug connector portion has a lug connector length ("L6");
wherein the left rail has a left rail depth ("LRD");
wherein the left rail track has a left rail track depth ("LRTD");
wherein LRD>LRTD; and
wherein L6≈L1+LRTD.
9. A modified lug press comprising:
a lug press comprising:
a lug press die; and
a lug press drive;
wherein the lug press, when activated, crimps a given lug, positioned in the lug press die, to a given wire;
wherein the given lug includes:
a lug connector portion; and
a lug barrel portion; and
a lug cartridge holding the given lug and at least one additional lug, and successively aligning the given lug and the at least one additional lug for insertion onto the lug press die; and
wherein the lug cartridge comprises:
a left rail;
an upper middle rail;
a lower middle rail; and
a right rail comprising:
a top surface; and
a bottom surface;
wherein the left rail is separated from the at least one middle rail by a connector separation distance ("L1"); and
wherein the at least one middle rail is separated from the right rail by a barrel separation distance ("L2"); and
wherein, upon insertion of the given lug, as aligned by the lug cartridge, onto the lug press die and activation of the lug press drive, the lug press crimps the given lug to the given wire;
a right rail adjustment device comprising:
a top adjustment plate;
wherein the top adjustment plate is fastened to a top surface of the upper middle rail;
a bottom adjustment plate;
wherein the bottom adjustment plate is fastened to a bottom surface of the lower middle rail;
an adjustment bolt extending through the top adjustment plate and the bottom adjustment plate;
a tightening knob, attached to the adjustment bolt, and positioned above the top adjustment plate; and
an adjustment nut, attached to the adjustment bolt, and positioned below the bottom adjustment plate;
wherein the adjustment bolt, when tightened, applies pressure, via the tightening knob, the top adjustment plate, the bottom adjustment plate, and the adjustment nut, on a top surface of the right rail and on a bottom surface of the right rail which secures the right rail, relative to the upper middle rail and the lower middle rail, at L2.
10. The modified lug press of claim 9,
wherein the top adjustment plate further comprises a top plate slot;
wherein the bottom adjustment plate further comprises a bottom plate slot corresponding to the top plate slot; and
wherein the adjustment bolt may be moved along the top plate slot and the bottom plate slot to adjust L2.
11. The modified lug press of claim 10, further comprising:
a lug drive which sequentially pushes the at least one additional lug along the lug cartridge and towards the lug press die.
12. The modified lug press of claim 11,
wherein the at least one additional lug includes, in sequence, a first lug and a second lug;
wherein the first lug is positioned, at a given time, at a first location on the lug cartridge next to the given lug;
wherein the first location is a location on the lug cartridge that is behind a center line for the lug press die;

wherein the second lug is positioned, at the given time, next to the first lug and at a second location on the lug cartridge;

wherein the second location is further away from the lug press die than the first location;

wherein the lug drive further comprises:

a lug drive motor;

a lug drive motor shaft; and a lug drive wheel;

wherein the lug drive motor shaft extends from the lug drive motor to the lug drive wheel and operatively connects the lug drive wheel to the lug drive motor;

wherein the lug drive wheel is positioned to contact the second lug, when the second lug is located at the second location on the lug cartridge; and wherein the lug drive motor, when activated, initiates a lug pushing action by rotating the lug drive motor shaft and the lug drive wheel;

wherein the lug pushing action facilitates direct pushing of the second lug towards the first lug and indirect pushing of the first lug onto the lug press die.

13. The modified lug press of claim 12, wherein the at least one additional lug includes a third lug;

wherein the third lug is positioned, at the given time, next to the second lug at a third location on the lug cartridge;

wherein the third location is further away from the lug press die than the second location; and wherein upon activation of the lug drive motor and pushing of the second lug towards the first lug, the second lug moves into the first location and the third lug moves into the second location.

14. The modified lug press of claim 13, wherein gravitational forces move the third lug from the third location to the second location.

15. The modified lug press of claim 13, further comprising:

a lug separator comprising:

a lug separator actuator;

a lug separator plate; and a lug sensor; and wherein the lug separator plate prevents the first lug from pushing the given lug off the lug press die after activation of the lug drive motor and before crimping of the given wire to the given lug during activation of the lug press drive.

16. The modified lug press of claim 15, further comprising:

a lug placement device comprising:

a placement motor;

a placement motor positioning shaft; and a placement positioning pad;

wherein the placement motor positioning shaft couples the placement positioning pad to the placement motor; and wherein the lug placement device, when the placement motor is activated, applies pressure on the given lug which inhibits dislodging of the given lug from the lug press die when the given wire is inserted into the given lug and when the lug press drive crimps the given lug to the given wire.

17. The modified lug press of claim 16, wherein the left rail further comprises a left rail opening; and wherein, when the placement motor is activated, the placement positioning pad is extended through at least a portion of the left rail opening until contact is made between the placement positioning pad and an edge of the lug connector portion.

* * * * *